March 12, 1940. E. A. THOMPSON 2,193,304
CHANGE-SPEED MECHANISM AND CONTROL
Filed Oct. 16, 1935 9 Sheets-Sheet 1
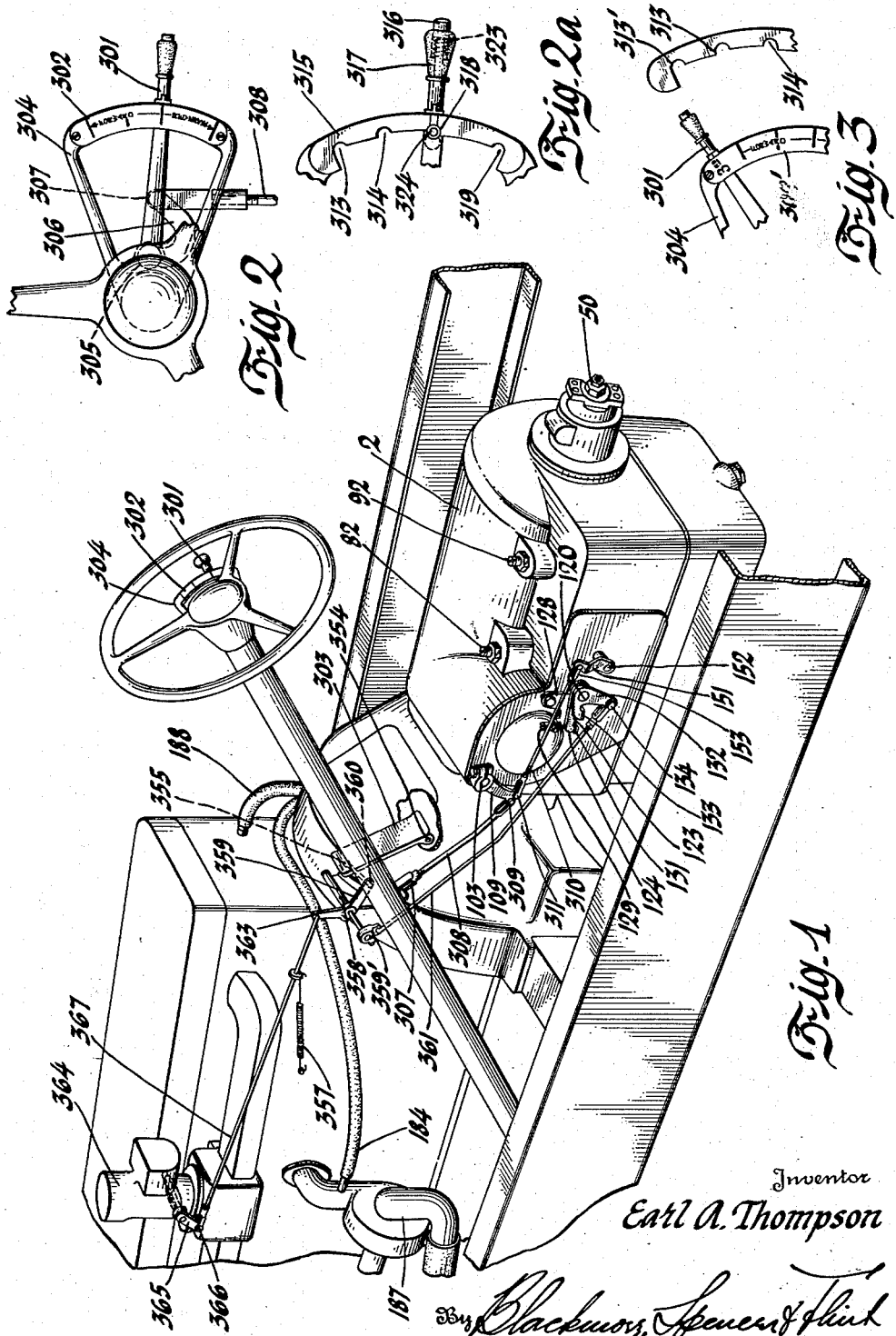
Inventor
Earl A. Thompson
By Blackmore, Spencer & Flint
Attorneys March 12, 1940.　　　E. A. THOMPSON　　　2,193,304
CHANGE-SPEED MECHANISM AND CONTROL
Filed Oct. 16, 1935　　　9 Sheets-Sheet 2

Inventor
Earl A. Thompson
By Blackmore, Spencer & Flint
Attorney

March 12, 1940.  E. A. THOMPSON  2,193,304
CHANGE-SPEED MECHANISM AND CONTROL
Filed Oct. 16, 1935  9 Sheets-Sheet 3
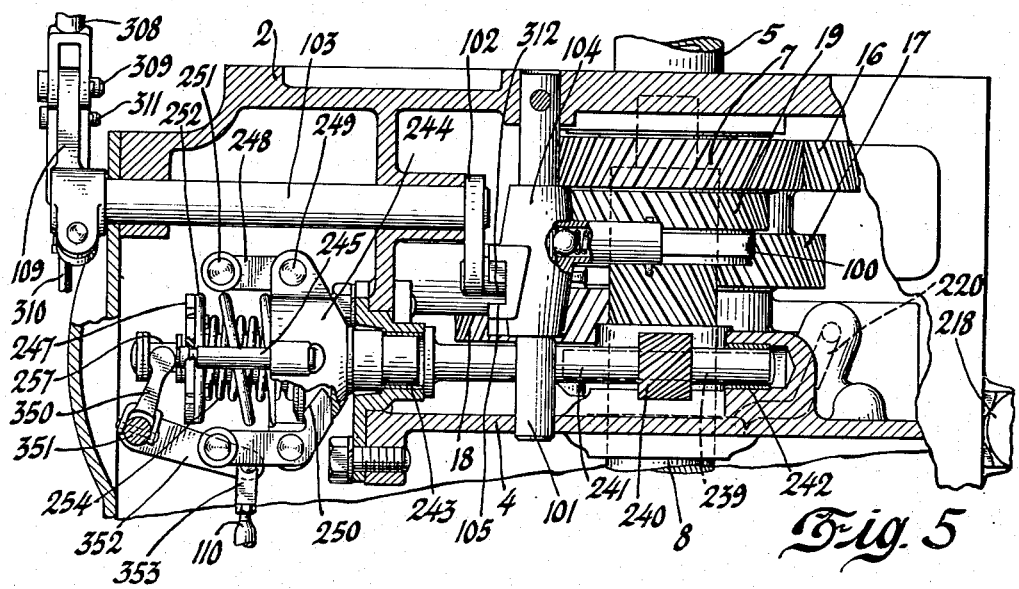
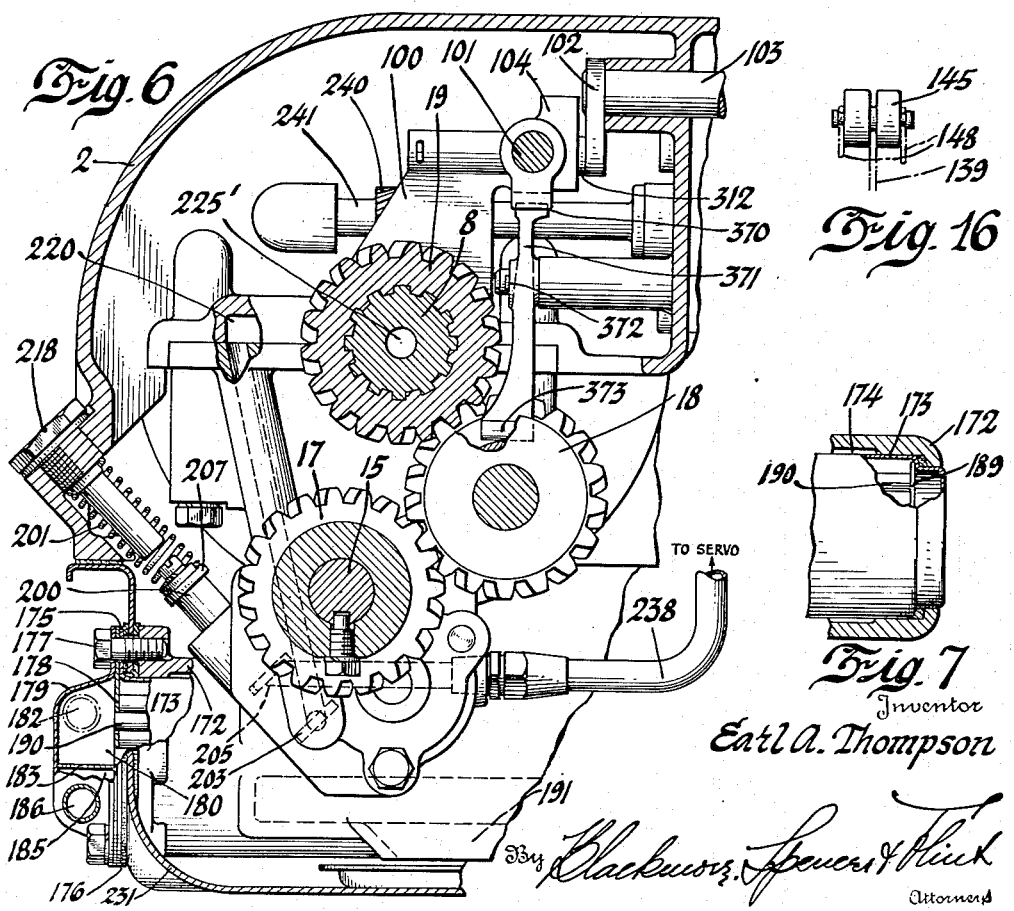
Inventor
Earl A. Thompson
By Blackmore, Spencer & Flint
Attorneys March 12, 1940.  E. A. THOMPSON  2,193,304
CHANGE-SPEED MECHANISM AND CONTROL
Filed Oct. 16, 1935   9 Sheets-Sheet 4
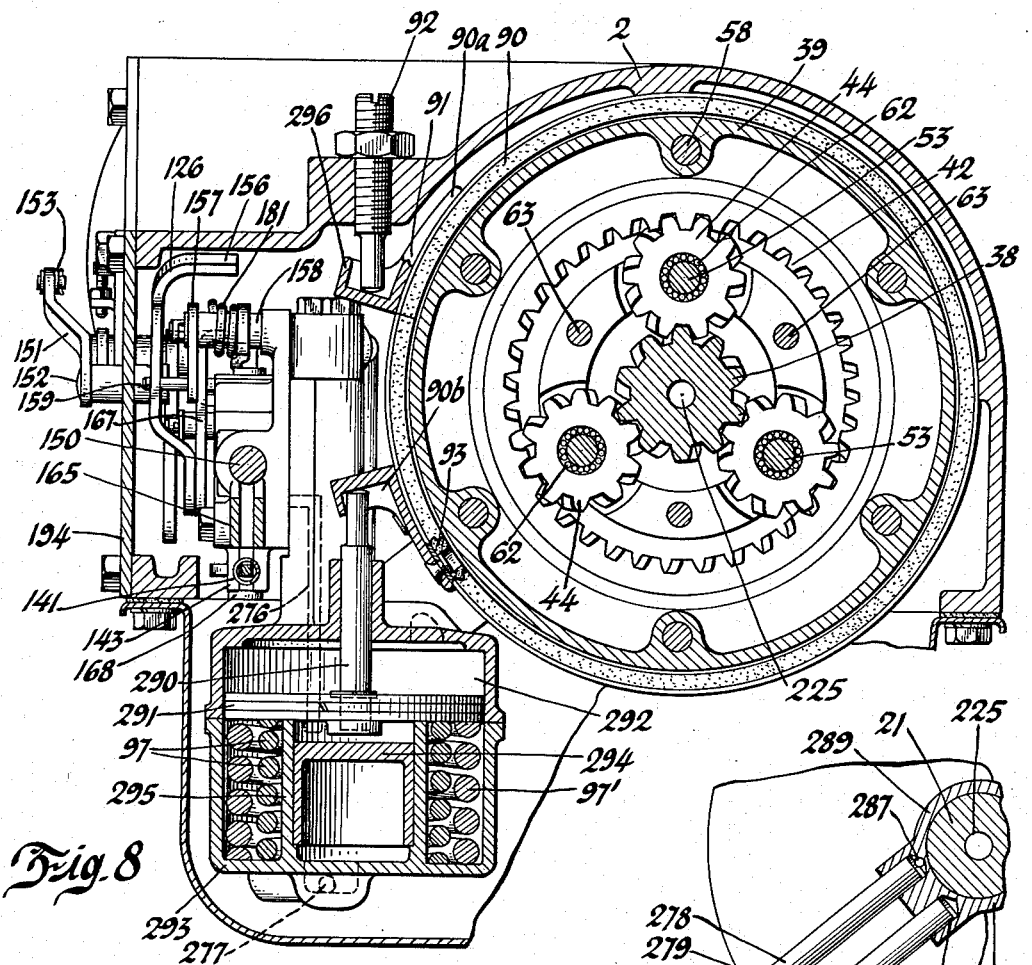
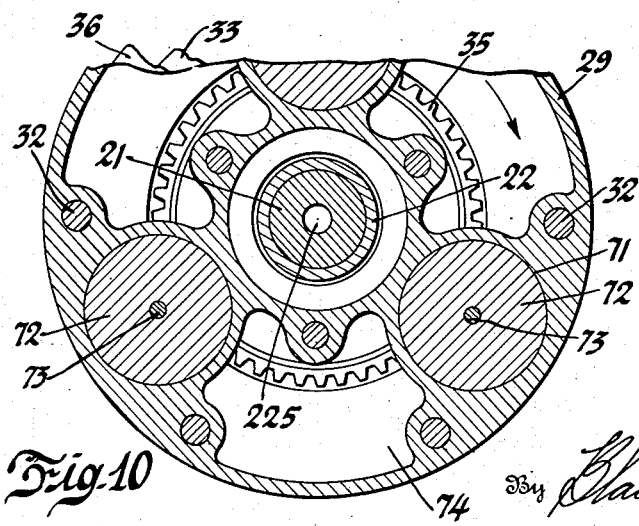
Inventor
Earl A. Thompson
By Blackmore, Spencer & Hulk
Attorneys March 12, 1940.　　　E. A. THOMPSON　　　2,193,304
CHANGE-SPEED MECHANISM AND CONTROL
Filed Oct. 16, 1935　　　9 Sheets-Sheet 5

Inventor
Earl A. Thompson
By Blackmore, Spencer & Hink
Attorneys

March 12, 1940.   E. A. THOMPSON   2,193,304
CHANGE-SPEED MECHANISM AND CONTROL
Filed Oct. 16, 1935   9 Sheets-Sheet 6
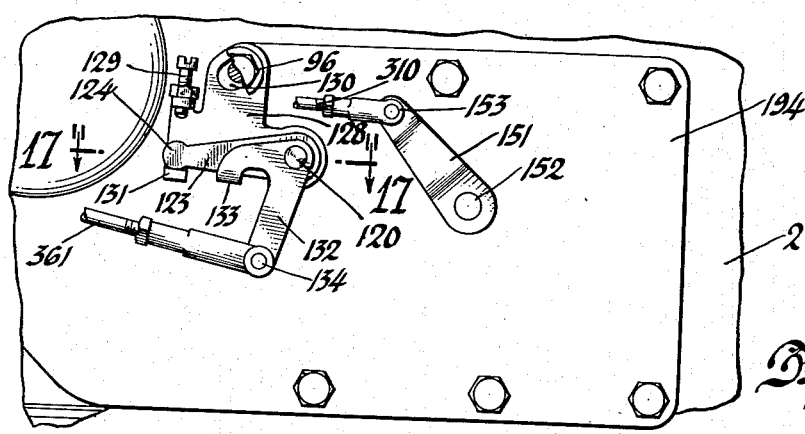
Fig. 14
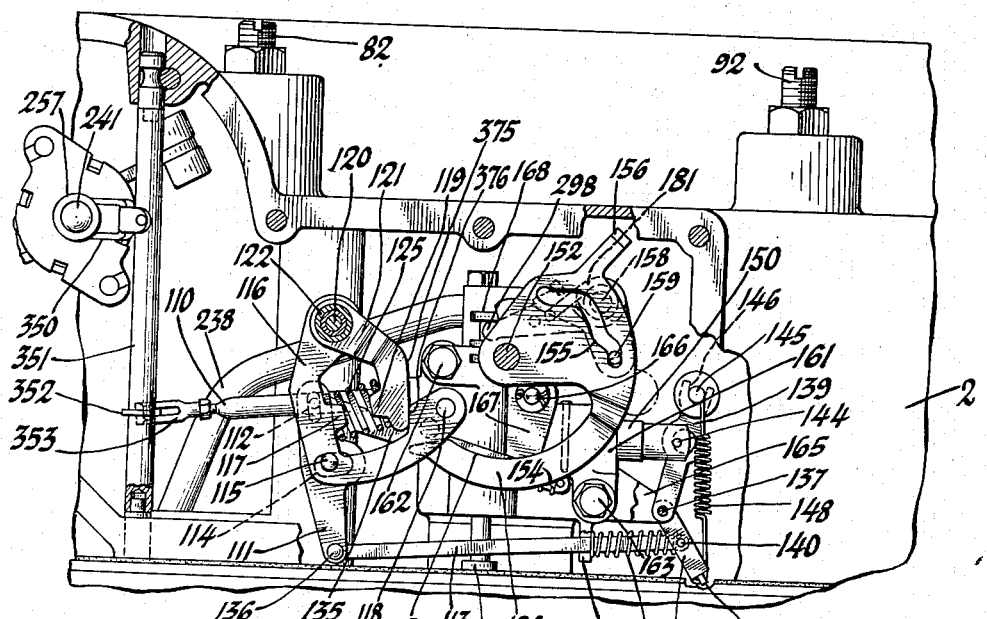
Fig. 15
Fig. 17
Fig. 18
Inventor
Earl A. Thompson
By Blackmore, Spencer & Flint
Attorneys

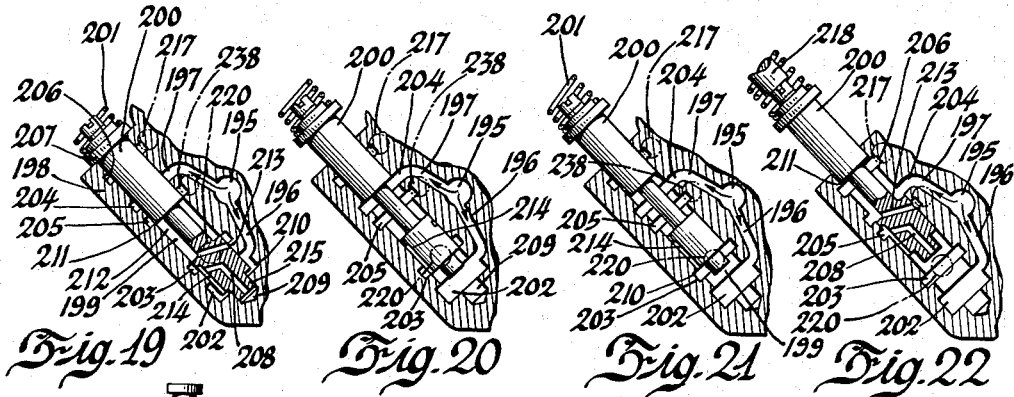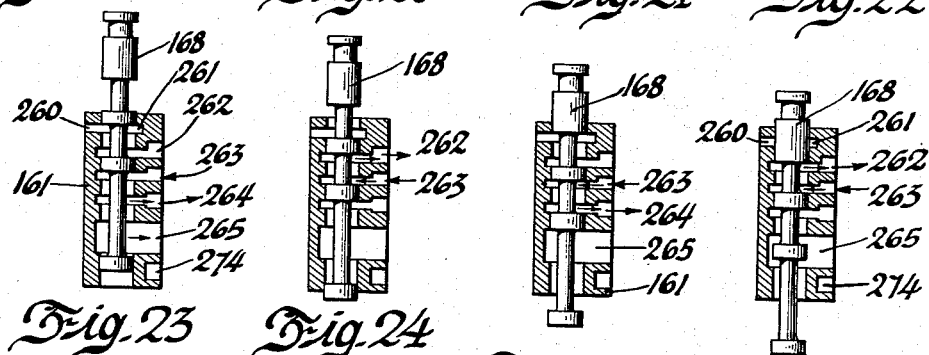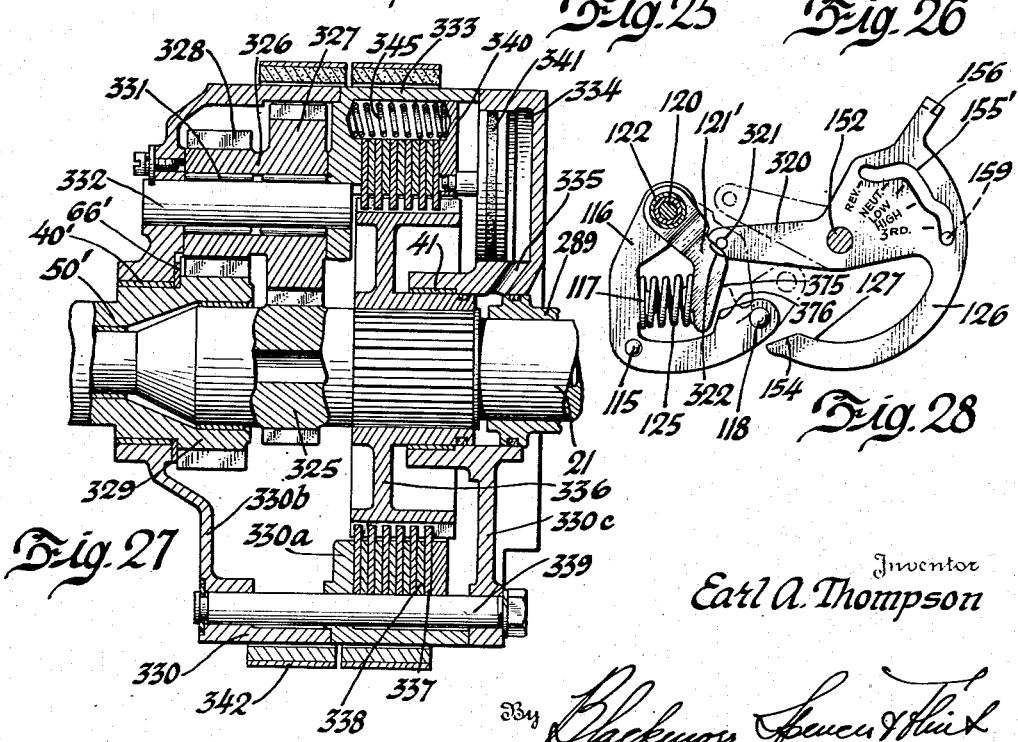

March 12, 1940. E. A. THOMPSON 2,193,304
CHANGE-SPEED MECHANISM AND CONTROL
Filed Oct. 16, 1935 9 Sheets-Sheet 8
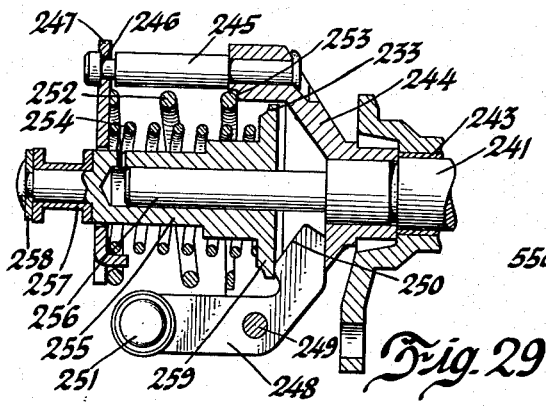
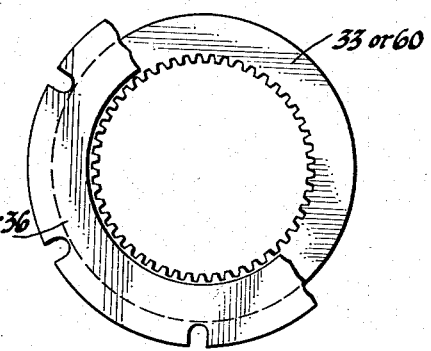
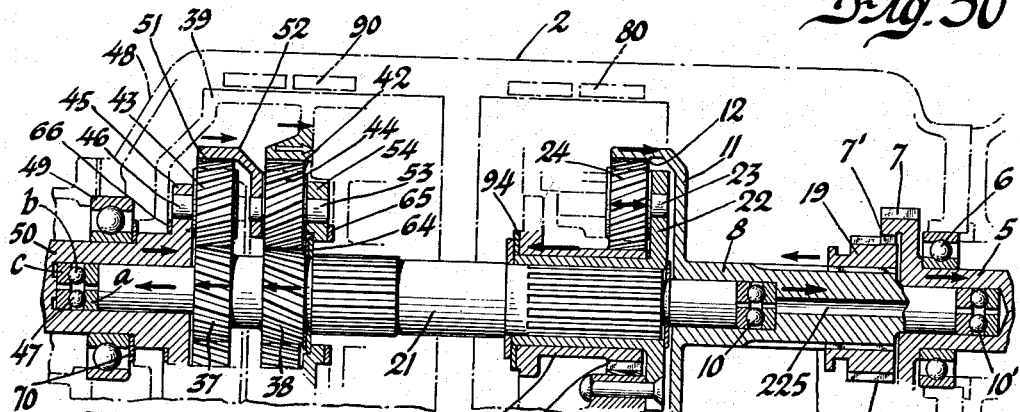
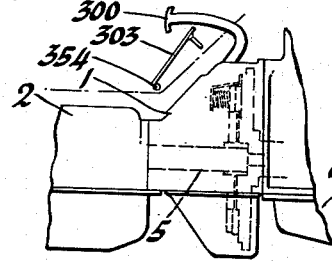
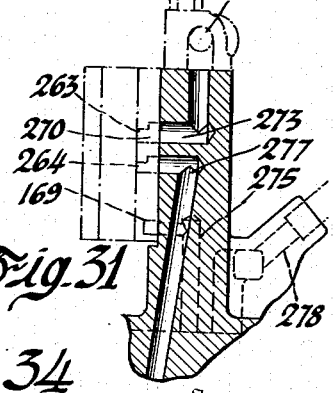
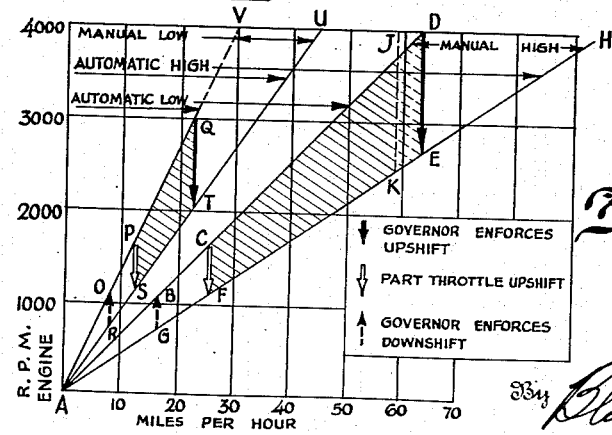
Inventor
Earl A. Thompson

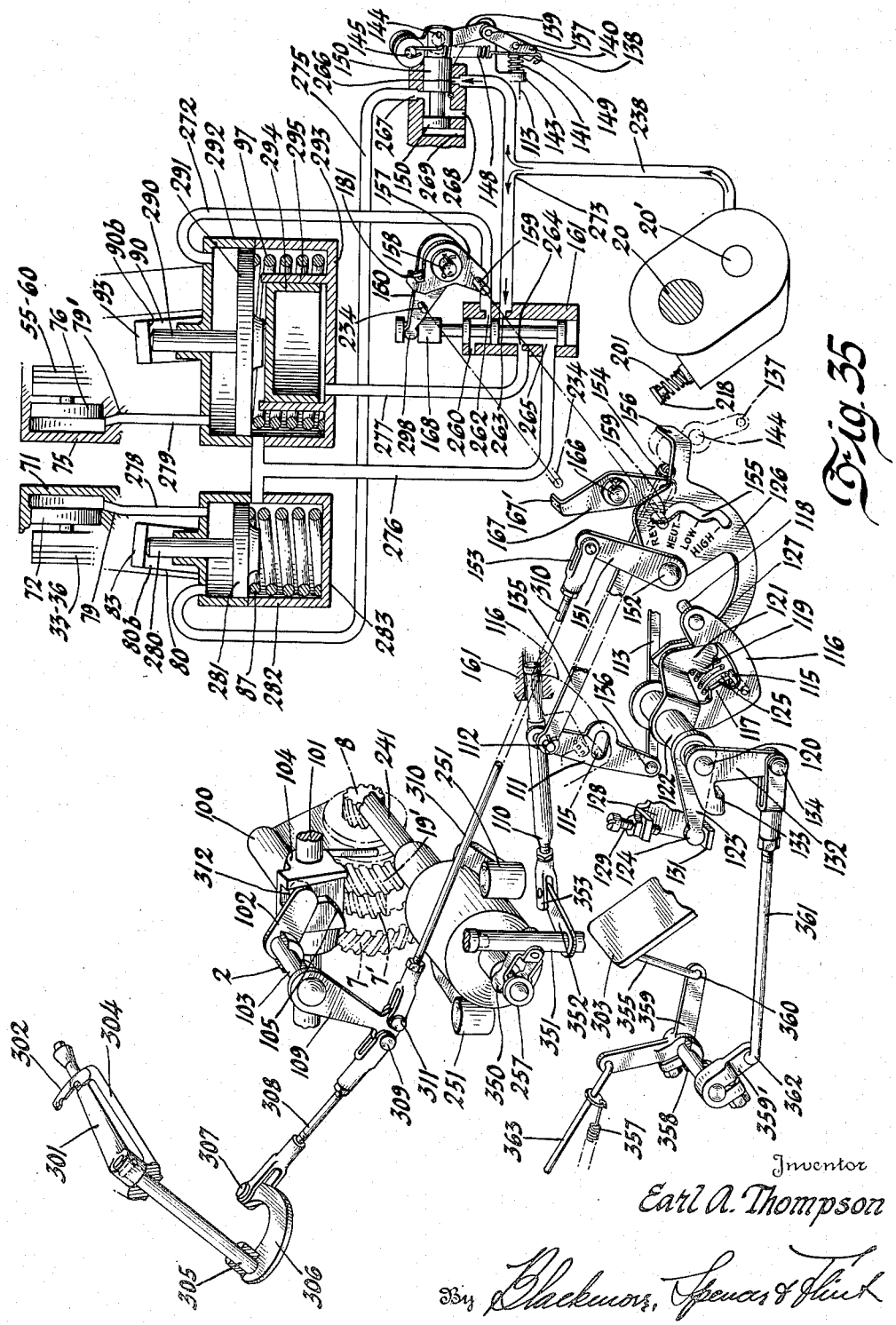

UNITED STATES PATENT OFFICE 2,193,304

CHANGE-SPEED MECHANISM AND CONTROL

Earl A. Thompson, Birmingham, Mich., assignor to General Motors Corporation, Detroit, Mich., a corporation of Delaware Application October 16, 1935, Serial No. 45,184

59 Claims. (Cl. 74—262)

The development of invention in this my present application is related to my prior U. S. Serial Number 659,752 filed March 8, 1933 and to my U. S. Serial Number 747,386 filed October 8, 1934. In the first of these I show the utility of my automatically controlled unit in conjunction with a gearshift of standard character, my unit providing automatic changes for a range of hand selected speed ratios.

In the second application, I show improvements in smoothness of transition from one ratio to another, and a degree of mastery vested in the operator-operable control members at any time, such that a high degree of safety in practical use is obtained.

The controls for transmission units connected in series between the power and the load for obtaining the full use of the transmission ratio ranges must establish a regime wherein during a shift from lowest ratio to highest ratio or vice versa, it is necessary to execute a simultaneous or nearly simultaneous shift in multiple units. An example of this is in seriatim two-speed gearing designed to provide four forward speeds. In such an assembly, "first" will be low gear in both units; "second" will be by low in one unit with the other in direct drive; "third" will be by direct drive in the first unit, with low in the second. "High" will be direct drive in both units.

During a transition from "second" to "third" a change in both units is required. The alternatives are to interrupt the torque path in one unit, make the shift in the second unit during the no-drive period of the first, and then complete shift in the first unit; or else make the effort to establish a simultaneous shift in both. The first alternative often results in a lurching of the drive, and the high inertias of the rotating parts are difficult to absorb without unpleasant notice to passengers and driver. The complications of sequence controls so as to avoid jerks and uneven and lengthy shift intervals are also troublesome from the point of view of mechanical adjustment and retention of desired sequences of ratios. In the present arrangement of my invention simultaneous or practically simultaneous shift operation in both units is achieved, for superior advantage in a smooth change speed interval, quickly established and completed. Proper inertia absorption means are essential to that speed change interval which is preferred for quietness and lack of shock in transfer to a new driving condition.

In the general art of automatically operable or "self-changing" gearing, there are two ordinary types; first, wherein the no-drive interval of shift is established by opening of a main clutch; and second, wherein the main clutch need not be manipulated, the elements within the transmission providing all of the essentials for the no-drive interval. My invention discloses the latter, with improvements in simplicity over the first noted, and a resulting economy in the number of parts.

My combination of epicyclic gearing provides advantages in quietness and smoothness of ratio shift operation characterized by means to drive through helical gearing wherein axial thrusts and displacement forces are absorbed, or self-cancelling, and prevented from disturbing the alignment and adjustment of other units with which the epicyclic units are associated.

Another specific feature of my improvement lies in the creation of a type of gear unit which has particular utility in auxiliary ratio drive, due in part to its inherent ability to handle thrusts in a self-contained manner in small space, which provides special applicability to reaction mounting.

My improvement also includes a compound reduction drive wherein a greater range of ratio differences are available than in the common or simple types of planetary transmissions. My disclosure is of a true planetary gearing in which planetating action is had under torque as distinct from gearing in which rotatable counter gear carriers may be braked for speed ratios other than direct drive. The combination of scalar ratios herewith provided is likewise of unusual utility.

In the preferred construction, the invention is shown embodying in one form a change speed gear unit which may be utilized by itself as a ratio changer between a prime mover, clutch and a load to be driven; or which may be included in an assembly of change speed devices operating between a power and a load shaft, as described herewith. This showing is in the form of epicyclic gearings having alternate torque paths, one for example being a direct drive, another through gearing of double compounded form. In this embodiment, friction elements are used to connect direct drive and to set up drive through gearing, certain of said elements being normally biased to act in establishing one of the paths, and disconnectable by auxiliary power under the control of the operator.

An important feature of my invention is the manner of control by which automatic operation is had, yet in which overriding master control means may set aside the automatic selection and compel drive in a desired driving ratio.

My disclosures herewith show special advantages in the general assembly arrangement from the standpoint of low cost, rigid support of essential elements and ease of assembly, exemplified by the use of a partitioned case into which compartments the various gear units may be readily assembled, and completely sealed by a relatively light pan which serves as a lubricant sump. These advantages by reduction in mounting and assembly expense make it possible to extend the use of the disclosed improvements to low cost passenger cars.

The interconnection of the controls of my device with related controls of associated prime movers and variable speed transmission and clutch units is likewise herewith disclosed for a compounded power control regime wherein are obtained correlated functional change-speed effects.

In the present disclosure, while epicyclic gearings of simple and double compounded structure are shown, with a special development of self-supporting thrust absorption means combined with helical gearings, novelty and utility lie in the special advantages of quietness and the elimination of excessive axial movement between reaction elements and frame, for example; and in the pressure circulation of lubricant through a gear tooth system, in continuously moving paths, with a consequent saving in heat losses and in more uniform lubrication. I also provide a positively acting heat exchanger in this latter combination.

Additional features of novelty in my disclosure as regards auxiliary power supply, alternate actuation of selected speed ratio compelling mechanism, reciprocal and coordinate automatic controls therefor, involving combinations of driver will and driving conditions, and master selection controls capable of superceding automatically selected speed ratio settings will be apparent upon inspection of the following specifications.

Figure 1 shows the appearance of one form of my invention as mounted with the engine and transmission assembly of a motor car which it is designed to control. The view is taken from the left side of the motor car chassis, and represents all of the external appearing items of the particular form described.

Figure 2 is a view of the steering column area from above, showing the hand selection controls.

Figure 2a is a view of the position latch means and the handlever which cooperates with the sector plate of Figure 2.

Figure 3 shows a modification of the handlever control mechanism of Figures 2 and 2a.

Figure 4:
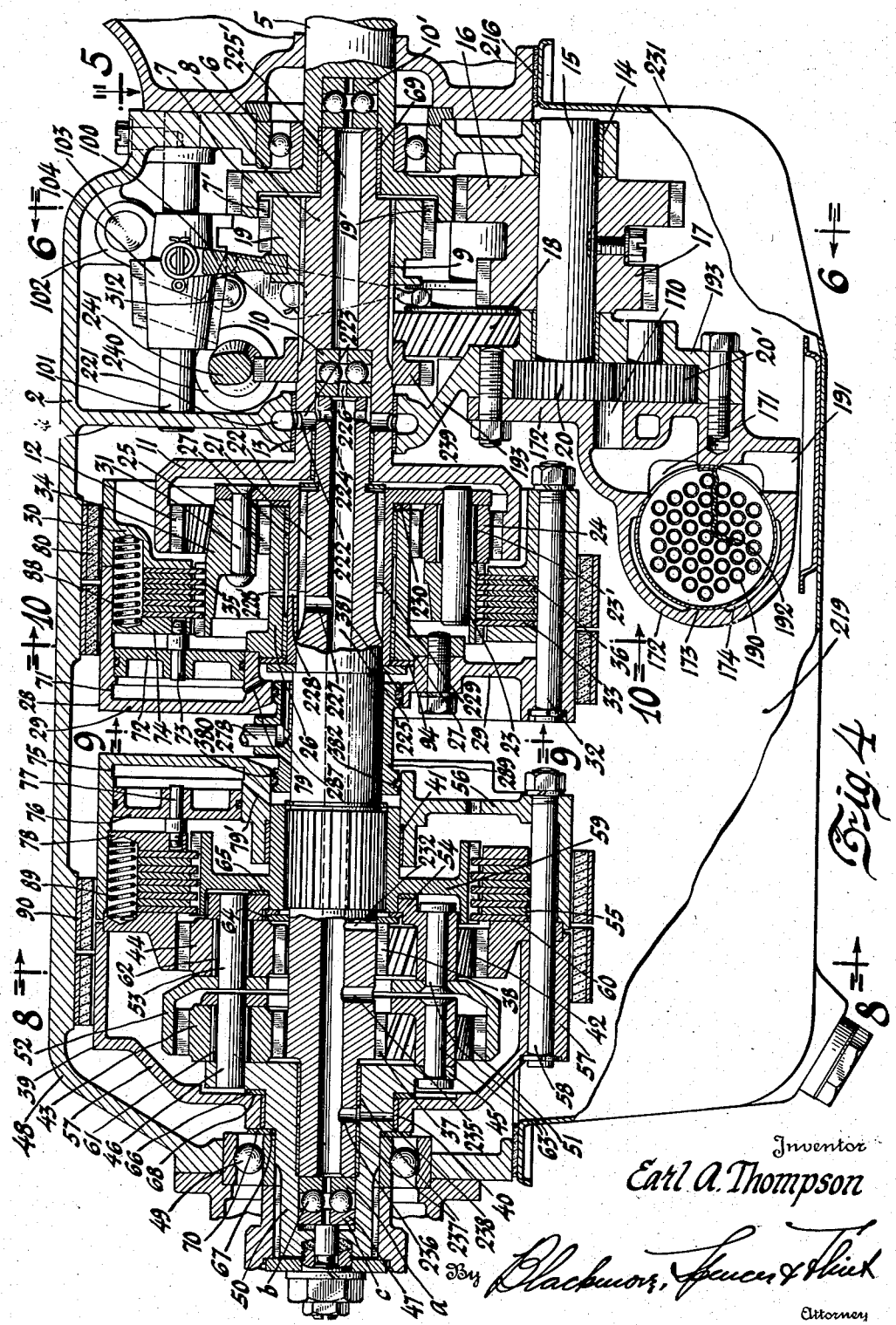

Figure 4 is a vertical section of the assembly of transmission units, with the engine connections at the right; the load shaft being to the left. This view shows the servo and lubrication supply means, the lubricant cooling means, the lubrication system, and the bearing and thrust supporting means. Various sections in other figures are taken from Figure 4 as a reference.

Figure 5 is a plan view in section with parts broken away taken about line 5 of Figure 4 of the forward-neutral-reverse unit showing the drive to the governor mechanism.

Figure 6 is a vertical section taken through line 6—6 of Figure 4, to show the arrangement of gearing of the forward-neutral-reverse unit, and the oil pump and delivery system for lubrication and servo purposes.

Figure 7 is a partial section of the oil cooler shown partly in Figure 6.

Figure 8 is an elevation section taken on line 8—8 of Figure 4, showing the actuating mechanism for the manual unit, and the control levers mounted on the left side of the transmission casing shown in perspective in Figure 1. Figure 9 gives a detail of the clutch pressure porting shown in section and taken substantially on line 9—9 of Figure 4. Figure 10 is a section at 10—10 of Figure 4 showing clutch pistons, plates and supports.

Figure 11:
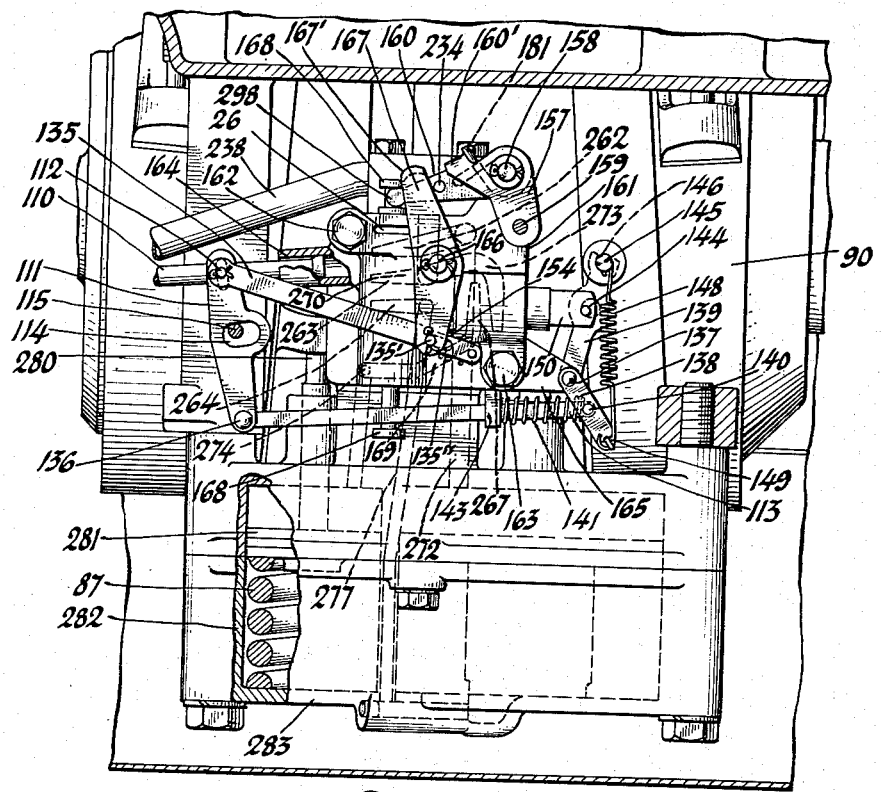

Figure 11 is a side elevation of the control assembly and valve mechanism of Figure 8.

Figures 12, 13:
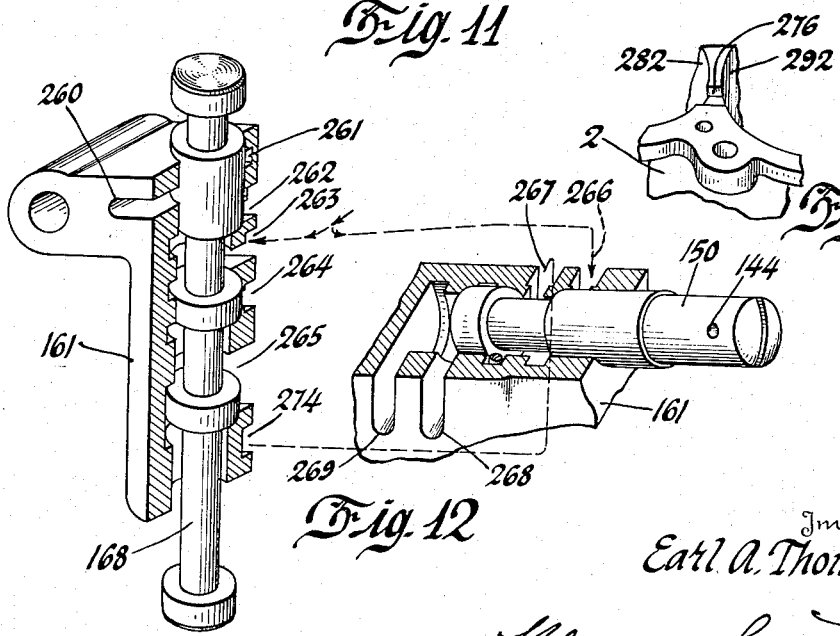

Figure 12 describes in perspective the valve casing and valves which control the automatic and manual units, with porting connected to lines leading to the cylinders of Figures 8 and 9. Figure 13 shows a detail of the cross connecting porting of Figure 11.

Figure 14 is an enlarged view of the assembly of externally mounted ratio control levers mounted on the left side of the transmission casing as in Figure 1.

Figure 15 is similar to Figure 11, and shows the corresponding internal control lever assembly in proper relationship to the external view of Figure 14.

Figure 16 is a detail of construction of a control part for the mechanism of Figures 11 and 15.

Figure 17 is a plan section taken on line 17—17 of Fig. 14 showing the ratio shift control connections between the external lever linkages of Figures 14 and 15. Figure 18 shows a view within the compartment of Figure 15, of the lever joining the governor-accelerator linkage to the control valve for the automatic unit.

Figures 19, 20, 21 and 22 show the various operating positions of the fluid pressure supply automatic valve control of Figure 6.

Figures 23, 24, 25 and 26 show the different positions of the control valve of the manual unit, in setting up the operating conditions of that unit for reverse, low and high.

Figure 27 shows in vertical section a modification wherein the manual unit of Figure 4 is replaced by a different type of gear arrangement.

Figure 28 demonstrates a modification of the control lever arrangement of Figure 15 in which an enforced shift made operative by the control handlever, is made available.

Figure 29 is a sectional view of the governor mechanism of Figure 5.

Figure 30 shows the form of the clutch plates of Figure 4.

Figure 31 describes the vertical section of the porting of valve assembly on the casing taken from the right of Figure 11.

Figure 32 shows the arrangement of thrust sustaining means between the rotating members, and between them and the casing of the transmission.

Figure 33 is an elevation view of the transmission and main clutch casings on a much reduced scale, showing the connection of the input shaft of the transmission with the engine, and the arrangement of the main clutch and accelerator pedals in dotted lines Figure 34 is a control diagram of the relationships between engine speed, car speed as influenced by accelerator pedal, governor, and auxiliary controls which may supercede the automatic shift action at described points.

Figure 35 is a schematic diagram of the controls for the complete system, composing the showings of Figures 1, 4, 5, 8, 11, 12, 14, 15, and 27.

The reversing gear unit

In Fig. 4, the vertical longitudinal section of the transmission structure shows the general relationships of the gearing and driving elements, with the forward-neutral-reverse gear unit at the right.

The clutch bell housing 1 of Figure 33 is attached to the transmission casing 2 by bolts (not shown). Web 4 separates the forward-reverse unit from the rest of the transmission, except for the sump oil connecting passages.

Clutch driven shaft 5 is mounted in the casing by ball bearing 6, and input gear 7 is fixed non-rotatably thereto. The helically splined shaft 8 of the forward-reverse unit pilots the forward end of shaft 21, where thrust bearings 10 and 10' deliver certain axial thrusts originating in the system of gearing and shafting to the casing through bearing 6. Thrust bearing 10' is in the pilot space between shafts 5 and 8.

Driven shaft 8 carries drum 11, the inner surface of which is internally toothed at 12 to form the input ring gear of the automatic unit. Bearing 13 in web 4 supports shaft 8 in the casing 2.

Countershaft 15 is supported at either end in bearings 14 in the casing. The first gear element 16 of the countershaft constantly meshes with input gear 7, and is fixed to countershaft 15.

The second gear element 17 of the countershaft may be meshed with slidable reverse idler 18 supported in casing 2. The reverse idler gear 18 may also be meshed with sliding gear 19 splined to and slidable on splines 9 of shaft 8. Teeth 19' are meshable with teeth 7' of gear 7.

The transmission lubrication and servo pump rotor 20, of the pump assembly to be described later, is driven by countershaft 15. The construction is shown in Fig. 4. The pump operates constantly, whenever rotational power is applied to clutch driven shaft 5.

The automatic unit

Shaft 21 in splined to carrier 22 of the automatic unit, and is piloted at the front end in shaft 8, and at the rear in shaft 50. Ported oil passages deliver servo and lubrication oil pressure to various units as will be described later. Shaft 21 is the power output member for the automatic unit.

Fixed to carrier 22 are spindle shafts 23 for planet pinions 24, which are three in number. Pinions 24 constantly mesh with the inner toothed ring 12 of drum 11, and with sun gear 25. The latter is integral with sleeve 26 rotating on bearings 27 on shaft 21; the sleeve 26 being bolted to webbed brake drum 28. Drum 28 has webs 29, and 30. Bolts 32 support clutch plates 33. Pinions 24 rotate on bearings 23' on shafts 23.

Extension drum 34 riveted to carrier 22 by rivets 31 is externally splined at 35 for clutch plates 36 which are engageable with plates 33, detail of which is shown in Figure 30. Governor drive parts are shown in Figure 5, in relation to the gearing of Figure 4.

The manual unit

In the manual unit, shaft 21 has affixed to it sun gears 37 and 38. Drum 39 rotates on bearings 40 and 41, and with toothed annulus 42. Pinions 43 and 44 mesh with sun gears 37 and 38 respectively, and pinion 44 meshes with annulus 42. Carrier 45 for pinions 43 is integral with or fixed to the final output shaft 50, having affixed pins 46 which serve as shafts for pinions 43.

The connecting elements between the two planetary groups are; annulus gear 51 meshing with planets 43, overhanging drum 52 and planet pins 53 on which planets 44 rotate. It will be seen that the parts 51, 52, 53, and ring 54 constitute an intermediate floating assembly or element which never is connected directly so as to transmit torque, or never held from rotation so as to furnish torque reaction.

Bearing 49 forms the rear support of the manual unit in the web 48 of casing 2. Thrust bearing 47, identical in construction with thrust bearing 10 transmits axial thrusts between shafts 21 and 50.

Drum 39 serves as the mounting of clutch plates 55, through web 56, section 57 and bolts 58. The mating interleaved clutch plates 60 are mounted in the splines of clutch drum 59 splined to shaft 21.

Shift actuation means

The ratio shifting controls integral with the transmission assembly are as follows. In the forward-reverse unit, slider gear 19 may occupy three positions; forward drive when clutched to teeth 7' of gearbody 7; neutral; and reverse drive when meshed with reverse idler gear 18. Yoke 100 is pinned to slider 104 mounted on rod 101 and controlled through arm 102 and shaft 103. This linkage is shown in Figures 1 and 5.

In Figure 8 is shown anchored at 91 in casing 2 one end of brake element 90. Pin 92, locked by a nut, engages the socket of anchor piece 91. The free end 93 of brake 90 at socket 90b engages piston rod 290. This brake element as shown consists of multiple turns wrapped so that upon fluid actuation when the unit is operating, the self-energising force does not act until the drum has reversed through zero speed. Preset or pre-energised springs, held off by the fluid pressure system to be described, are effective to actuate the brake for self-energisation. The actuating forces of clutch release are provided by springs 88. The detail of the servo system is shown in Figures 11 and 35. The brake 80 of the automatic unit is identically constructed, and anchored at 82, Figure 15.

Clutch 55—60 couples reaction drum 39 to shaft 21 to establish direct drive in the manual unit, and brake 90 prevents rotation of drum 39 and annulus gear 42 to establish reduction drive. The clutch detail is given in Figure 30. Similarly, clutch 33—36 couples clutch drum 28 to drum 34 for direct drive in the automatic unit, and brake 80 attached to casing 2, and working on piston rod 280, establishes reduction drive. (See Fig. 35.)

In summation of structure and drive relationships, either unit may therefore be in direct or reduction drive by alternate operation of the brake or clutch respectively, yielding four net forward speeds, as in the following examples:

|   | Ratio   | Automatic unit | Manual unit |
|---|---------|----------------|-------------|
| 1 | 3.375/1 | Reduction      | Reduction.  |
| 2 | 2.25/1  | Direct         | Do.         |
| 3 | 1.5/1   | Reduction      | Direct.     |
| 4 | 1/1     | Direct         | Do.         |

For example, with reduction ratios of 1.5 to 1 in the forward or automatic unit; and 2.25 to 1 in the manual or rear unit, the overall lowest ratio available would be 3.375.

The next lowest ratio would be 2.25 to 1, obtained by keeping the manual unit in reduction, and shifting the automatic unit to direct. Now if we shift the manual unit to direct, and the automatic unit to reduction, we obtain a net overall reduction of 1.5 to 1. Direct drive in both units yields 1 to 1, all elements rotating together. It is entirely feasible to obtain all of these ratios superimposed on the reverse drive gear ratio, but is unnecessary for passenger car purposes. The output shaft may be connected directly to the final drive of the vehicle propeller shaft through the customary universal joint, or it may be joined to a distributing system of shafting involving multiple connections to the vehicle wheels.

*Thrust compensation*

The direction of helical cut of the gearing is taken so that residual thrusts not compensated for are uniformly distributed to the casing, the proper placing of thrust resisting elements being an essential feature described in conjunction with Figure 32.

In the automatic unit the axial thrust on the input annulus 12, under engine torque, is toward the engine or to the right in Figure 32.

Corresponding thrust in the pinions 24 is opposite. Between sun gear 25 and pinion 24 the residual thrust is exerted to the left and is taken through washer 94 to shaft 21, bearing 47 and shaft 50.

The shaft 50 is supported in web 48 of casing 2 in bearing 49, and extends into said casing. The shaft will hereinafter be known as the output shaft of the manual unit.

The adjacent end of shaft 21 rests against disc a and balls b of thrust bearing 47 which transmits compressional forces between the shafts resulting from operation of the gearing.

As noted above, integral with shaft 21 are helical pinions 37 and 38, shown in the drawing as of the same diameter; but not necessarily so according to my invention. The teeth of pinions 37 and 38 are cut with right hand helices, and mesh with planets 43 and 44 respectively.

Shaft 50 is integral with carrier 45, the latter supporting planets 43 mounted on pins 46 and bearings 61. Shaft 50, the output element of the gearing, may be connected to the driving wheels of the vehicle, or to the propelling means such as an aircraft propeller hub in any desirable fashion.

Overhanging annulus gear 51 meshes internally with planets 43 and its web or extension 52 carries planet spindles 53 and bearings 62, which support planets 44. Ring 54 is joined to web 52 by through bolts 63, and is supported against axial movement by thrust washers 64 and 65. The bearings 61 and 62 are of the multiple needle type.

Drum 39 rotates freely on bearings 40 on hollow shaft 50, and on bearings 41 on drum 59. The drum 39 is ground externally to form a braking surface, and rotating independently therefrom are the internal gear teeth 51 meshing with planets 43. Planets 43 and 44 are cut to left hand helices, and likewise the overhanging gear 51 and annulus 42. Integral with drum 39 is the driven clutch assembly 55 to be described later. The driving clutch assembly 60 mounted on drum 59 rotates with shaft 21 as hereinbefore noted. Between carrier 45 and the overhanging web 57 of drum 39 is thrust washer 66. Shoulder 67 of shaft 50 and shoulder 68 of web 57, through washer 70 abut bearing 49 inset in web 48 of casing 2.

Recessed in cylinders 71 in flange 29 of drum 28 are clutch pistons 72, guided by pins 73 in presser plate 74. Similarly, cylinders 75 in web 56 of drum 39 are fitted with pistons 76 guided by pins 77 in presser plate 78. Drilled passages 79 lead to cylinders 71 and passages 79' lead to cylinders 75.

*Lubrication and servo system*

The main supply of transmission lubricating oil for all three transmission units is kept in the sump 219. The main drive for the pump is by means of shaft 15 to which rotor gear 20 is fixed. The pump is operating at all times whenever shaft 5 is running by virtue of the drive transmitted through gears 7 and 16. The construction is shown in Figures 4 and 6.

The suction space to the pump leads to port 170 attached to outlet port 171 of the oil cooler unit which consists of cartridge 173 dimensioned to fit recess 174 in casing 172 bolted to web 4 of the transmission housing. The cartridge is flanged at 175 to fit external seat 176 of the recess 174, and readily removable by bolts 177. The water header 178 is enclosed by shell 179, divided by baffle 183. The upper half 180 of the header 178 leads through fitting 182 to pipe 184 connected with the pressure pump 187 of the engine cooling circulation system. The lower half 185 of the header 178 is fed through fitting 186, and pipe 188 connected at another point with the engine cooling circulation system. The water header 189 is drilled out to accommodate flanged or turned pipes 190 nested so as to provide uniform clearance, the opposite ends of said pipes being similarly fitted into the water header 178.

The cooling water flow is therefore through one half of the tubes 190 from inlet pipe 184 of the water header to the header 189 shown in Figure 7, and then through the remaining half of the tubes 190 to the outlet pipe 188 of the water header. Heat exchange takes place through the walls of the pipes 190 to the water from oil which is drawn through long slot 191 over the tubing 190 directed by baffle 192 to the outlet port 171, of smaller aperture than slot 191, so that relatively low velocity of oil is had at the point of oil pick-up from the sump. This is a novel combination of oil cooler with servo and lubrication pump having special advantages for bringing the point of heat exchange adjacent the spot where heating of the oil begins—namely, at the pump rotor 20, and the mounting of the casing 172 which is a backing web for the pump as well as a support for the oil cooler unit, is of unique benefit in mounting economy as well as in handy assembly. Driven pump gear 20' is spindled to rotate in a portion of web 193 integral with web 4.

Pump suction is exerted at space 170 because of the well-known effect of gear pumps, and pressure is developed as long as rotor receives drive through the described gearing path. Driving in reverse does not affect the positive delivery of pressure by the pump, since the point of torque reversal is beyond the pump drive, in the transmission power line. The outward flow of oil is best seen in Figure 19 where pressure space 195 opens to milled passages 196 and 197. Valve cylinder body 198 may be integral with the web 193 or separately attached. Valve member 200 moves back and forth in ported passage 199, held by spring 201 in the "down" position, as in Figure 19, and lifted by pressure furnished by the pump through milled leads 196 and 197.

The valve member 200 is a ground fit in this passage 199 to form seats between the ports which will now be enumerated; port 202 at the lower position, open to lead 196 from the pump; port 203 connected to the transmission lubrication main 220; port 204 connectable to lead 197 to the pump; port 206 connected to exhaust hole 217; and port 205 connected to the servo pressure main 238. Flange 207 acts as a stop and affords a seat for spring 201. A smaller extension of 200 fits bore 209.

Valve member 200 has a connecting drilled lead 208 which may deliver pump pressure from bore 209 to the transmission lubrication main 220 through port 203. A flat 214 cut as shown also provides immediate circulation of lubricant, even when the engine is idling, as shown in Figure 19. Assuming an increase of pressure in the pump, valve member 200 will rise as pressure builds up behind abutment 210, to the position of Figure 20.

This is accelerated by the exposure of pressure to a greater area as the lower area of 210 passes the lower limit of port 202. Now when abutment 211 of valve member 200 exposes port 204, the fluid pressure from lead 197 may now be delivered through port 205 to the servo pressure line 238 as shown in Figure 21. Now pressure from lead 196 is supporting the valve member 200 in the new position.

This is the normal running position of the valve 200. A decrease in pump pressure below a minimum causes valve 200 to move down until drilled lead 213 discharges into port 203 and dumps the oil from the servo line into the lubrication main 220 through space 212. Projection 210 may enter readily bore 209 since the oil cushion at that point is relieved through passage 208 and flat 214. Initial pressure lifts abutment 210 when the pump is started up.

When operating at extreme speeds, the pump would create more pressure than the system requires unless means to relieve the excess were provided. At such pressures, valve is in the extreme "up" position with spring 201 fully compressed as in Figure 22. At this setting, abutment 211 is opposite the upper limit of relief port 206.

Excess pressure from pressure lead 197 may escape direct to port 206, whence it goes back to the transmission sump by relief hole 217. This does not blow off the servo, since port 205 is connected by restricted passage 213 to relief port 206, so that when running at high speed, and the relief action occurs whenever the pressure requirement is exceeded, no disconcerting change in the operator's control over the servo mechanism occurs.

The utility of this valve and porting combination is that it maintains uniform servo line pressure, yields a positive servo cut-off at a given minimum pump pressure, and protects both servo and lubrication systems against excess oil pressure. An additional feature is the utility of the leak pass 214 at idling speeds for initial lubrication.

The unique feature in this construction is the rapid release of servo pressure, which prevents hunting and consequent slipping of the clutches and brakes in the transmission assembly; a feature of unusual commercial value, in that excessive wear and heat are avoided.

This device can be preset to operate at given pressures by adjustment of screw fitting 218 in the housing, which bears against the upper end of spring 201.

Conduit 220 connects to passage 221 in web 4 of housing 2. Oil may flow freely from 221 to annular channel 222 cut in the external portion of hollow shaft 8 of gear 12. Drilled holes 223 connecting to channel 222 feed oil to the passages 224 transverse of shaft 21. Longitudinal passage 225 in shaft 21 carries lubricant to the gears of both the automatic and manual units. The thrust bearing 10 located between shafts 8 and 21 is oiled through hole 226.

Side-cut passage 227 in shaft 21 delivers oil from passage 225 to a series of drilled outlets 228 in the sleeve of 22 and a series of drilled outlets 228' through the shank 26 of reaction sun gear 25. Oil may flow axially through splines 229 to the space between the web of carrier 22 and the adjacent face of drum 11 to teeth 12 and planets 24. Oil also passes through bearings 27 to the teeth of sun gear 25, by washer 230.

Drain out of such oil under pressure finds its way back to the sump 219, the opening of clutch 33—36 relieving the accumulated oil in the drum.

Side-cut outlet 232 connects passage 225 so as to lubricate thrust washers 64 and 65 and the meshing teeth of gears 38 and 44. Similarly, drilled outlet 235 delivers oil to the teeth of meshing gears 37 and 43. A third outlet 236 feeds oil to bearing 237 and it passes from that point to drilled hole 238 in shaft 50 to bearing 40 between the sleeve of drum 57 and the shaft 50. Bearing 49 in web 48 receives oil from this pressure source.

The forward-reverse unit obtains oil under pressure from main passage 225, passage 226 in 10a'—10c', and passage 225' in shaft 8. Outward flow in thrust bearing 10' may deliver oil to the pilot bearing 69. Further lubrication of the unit is by customary dip in the sump level oil. Because of the rigid compartment construction of casing 2 it is possible to seal the entire assembly with oil pan 231, which acts as an oil reservoir, sealing means 216 providing a tight joint at all contact points.

The use of a common sump for all three gear units yields advantages for uniformity in cooling, rapid re-circulation, and maintenance of proper capacity requirements, as well as providing a one-fill job for service replacement of oil. It is worthy of note that the resistance drop of the circuit of oil pressure mains is so arranged that with very slow engine speeds, as at idling, a plentiful supply of fresh oil is pumped through the transmission units. This is available the instant the engine starts up since the countershaft which drives the oil pump gear 20 is constantly driven from the main clutch driven shaft 5 through gears 7—16.

For servicing and test the main clutch pedal 300 of Figure 33 may be used as a master control over pump drive. In the prior art, dump valves to relieve servo pressures, or equivalent short-circuit or cut-off devices appear, connected to separate items which perform the cut-off function. In some cases these are shown attached to accelerator linkage to shift levers, and to separate control elements mounted on dash, steering column or instrument board.

To relieve the driver or servicer from learning new modes of operation, I arrange the servo mechanism so that when the car is standing still, the driver may warm up a cold engine by holding the main clutch pedal 300 in disengaging position. This operation may be carried on without forcing oil unnecessarily through the servo system.

When the car is in motion with jaw clutches 7'—19' engaged, the pump gear 20 is always supplying servo and lubrication pressure. If the jaw clutches are disengaged by shift of the hand lever 301 to neutral, the pump still will be driven by the engine, until the main clutch is disengaged by pedal 300.

To withhold drive from the pump, it is therefore necessary to shift the hand lever 301 to neutral, and hold the main clutch open which establishes a safeguard against the pump being inoperative at any time, unless the car driver so wills it.

*Ratio control linkage*

Rod 110 is moved by the governor toward the left in Figure 15 as engine speed increases. It is pivoted to equalizer bar 111 at slot 112.

The opposite end of the equalizer bar 111 is pivoted to rod 113 at 136, and near its center, slot 114 is engaged by pin 115 set in scimitar-shaped lever 116. The latter lever is pivoted on shaft 120 as a center; carries spring stop 117 and also pins 118 and 115.

Opposing spring stop 119 is integral with lever 121 fixed to hollow sleeve 122 surrounding shaft 120, the outer end of which carries lever 123 having cam-end 124 (see Figure 14). Intermediate spring 125 transmits forces in compression between levers 121 and 116, the spring stops 119 and 117 preventing the spring from leaving position.

Pin 118 in lever 116 may engage long cam slot 127 of plate 126 rotatable on shaft 152, the function of the slot being to prevent or limit clockwise rotation of lever 116, except when in high speed position.

Adjustable stop plate 128 is also pivoted on shaft 120 and adjusting clamp screw 96 is used to fix the angular position of plate 128, by reference to slot 130. The fixed stop 131 and the adjustable stop screw 129, establish the range limits of movement of the cam end 124 of lever 123 about center 120. Stops 375, 376 limit motions of 116 and 121.

Lever 132 is mounted in the external lever compartment of Figure 14, rotatable freely on shaft 120 and its stop or lug 133 turned away from the observer's eye may engage the lower edge of lever 123. Lever 132 is linked to rod 361 at clevis 134, and responds to the accelerator pedal movement of Figure 1 where the forward end connections of rod 361 are shown. Fig. 17 shows the connections about shaft 120 between the externally and internally mounted levers of Figures 14 and 15.

For a given position of governor link pivot 112, lever 132 may rotate about center 120 clockwise, stop 133 will engage lever 123, whose arm 121 and spring stop 119 will then compress spring 125 applying an increasing force to cause clockwise motion of scimitar-shaped lever 116. Pin 115 thereupon exerts a leftward force upon equalizer bar 111, and on link lever 113 attached to it at pivot 136.

An increase in governor speed will tend to shift pivot 136 to the right, tending to counteract the above mentioned force.

On fixed pivot 137 toggle arms 138 and 139 are mounted, the lower arm 138 being pivotally attached to coupling 140. The engaging end of link lever 113 coacts with coupling 140 assisted by spring 141 recessed between guide lug 143 and the pin 140 on link lever 113. Thus a rightwardly exerted force in rod 113 acts on coupling 140 to cause arm 138 to swing counterclockwise about fixed pivot 137.

The upper arm 139 of the toggle is yoked to valve body 150 by loose pivot 144, and also at the upper end, carries weighted pivot 145 in slot 146. Toggle spring 148 attached to arms 138 and 139 and 149 and 145 respectively, stores energy for snapping the valve right or left, as pivot 149 of arm 138 is moved past center with relationship to fixed pivot 137 and pivot 145 of arm 139.

When valve body 150 is in the right hand position as will be seen later, fluid pressure is admitted to hold off brake 80 and engage the clutch 33—36 of the automatic unit. When it is in the left hand position, the fluid pressure of that system is released and the automatic unit is put in low gear drive by spring 87 actuating brake band 80.

Plate 126 rotating with shaft 152 is rocked by movement of externally mounted lever 151 attached to shaft 152. The latter lever is joined to rod 310 at clevis 153, and selection movement of hand lever 301 of Figure 1 acts to shift lever 151 to operator-selected positions, through 310, pivots 311 and 309, rod 308, clevis pivot 307, arm 306, shaft 305 and lever 301.

The interaction of cam slot 127 with pin 118 is useful in eliminating downshift of the automatic unit when the handlever 301 is in "low," cam 127 restraining pin 118. Resumption of "high" drive restores the coaction by moving cam end 127 out of contact with pin 118, whereupon the latter is free and automatic action is resumed.

Irregular cam slot 155 cut in plate 126 actuates the valving connected with the operation of the manual unit. Projection 156 acts as a stop engaging with toggle arm weight 145 to prevent automatic shift to high ratio in the automatic unit, after the plate 126 is in reverse position. This is known as the automatic unit lockout mechanism.

The lever 157 (see Figure 11) pivoted at 158 on the casing carries lug 160' which engages lever 160 counterclockwise. Lever 160 moves valve 168 at 298 and carries pin 234 which may strike lug 167' of lever 167. Spring 181 bears against lug 160' and permits 157 to swing clockwise when pin 234 may be restrained. Pin 159 of lever 157 fits cam slot 155 of plate 126. The centers 152 and 158 are taken with respect to the arm 158—159 and the radii of slot distances from center 152 so that movement of arm 151 by rod 310 forces lever 157 to follow clockwise motion of lever 151, actuating valve 168 of the manual unit, shown in Figures 12, 15 and 35.

Valve 168 is moved by lever 160 through head 298 and follows the movement of lever 151. When the lever 151 is in its limiting counterclockwise position as in Figure 15, the valve 168 is at its bottom limit of travel, and when 151 is at its limiting position in the clockwise direction, with pin 159 in the "reverse" position of slot 155, the valve 168 is in its extreme up position. Further text describes the effects of these positions on the fluid servo system valving.

Connecting rod 135 attached at pivot 112 to governor rod 110 is pivoted to lever 167 at 135'. The lever 167 is pivoted on valve case 161 at 166 and its upper end is turned over to form curved lug 167'. Pin 234 on lever 160 moves in an arc to be intercepted by lug 167' at maximum governor speeds, so that the manual unit valve 168 cannot be moved up, or raised from its position which establishes direct drive in the manual unit. Cover plate 194 is bolted to housing 2 and protects the lever assembly of Figure 15 from dust and dirt. Pin 135', spring 154, and slot 135" in rod 135 permit governor action to proceed without being affected by jamming of 167 through forces on 160.

Servo controls

Mounted on the left side of the transmission are the control linkages of Figures 11, 14 and 15, and whereby the selection of transmission speed ratio is accomplished.

In Figure 11 valve case 161 is bolted to the transmission housing at 162 and 163. At the left is socket 164, which receives the projected end of governor connected rod 110 for alignment purposes. At the right is toggle support 165 for pivot 137. A downward extension of the valve case casting terminates at the right in guide lugs 143, between which lever link 113 is constrained to move. Pivot pin 166 projects toward the eye of the observer and is a mounting for lockout link 167 of Figure 11.

To provide a clear idea of the construction of the valve case 161, Figure 12 shows a right angle section view taken vertically through the cylindrical portion of the case which embraces manual unit valve 168, and taken horizontally through a section of the case which forms a cylinder for the automatic unit control valve 150. At the left in this figure are shown five ports which will now be enumerated in order.

The uppermost port, 260, relieves fluid pressure from the cylindrical space 261, dumping the oil back into the external portion of the housing, from whence it drains back to the sump 219 of the transmission. The second port, 262, leads to the outlet of the casing, from where the oil may flow to the control cylinder 292 for the manual unit. The port 263 below is the inlet from the servo pump, and it receives oil from passage 273 through the porting shown in Figure 31. The next port, 264, delivers fluid pressure to passage 277, from where it is used to reinforce the load spring 97 of Figure 8. Walls 283 and 293 seal cylinders 282, 292.

The lowermost port, 265, leads to passage 276 and furnishes fluid pressure for reinforcing the spring pressure on brake bands 80 and 90 of both the automatic and manual units.

When the valve 168 is in the uppermost position, the pressure from the servo is admitted to both ports 264 and 265 below it, as in Figure 23, this reinforcing the brake bands of both units as in Figure 35. This reinforcement also is applied to the subpiston 294 of Figure 8. When the valve is in intermediate position as shown in Figure 25 the pressure is cut off from the lowermost port 265 and is only effective through port 264 to reinforce springs 97 by furnishing pressure back of subpiston 294. This is effective when the hand lever 301 is placed in the "low" position on the indicator plate 302. During downshift from direct to low speed ratio in the manual unit, this port relationship is effective, as well as when in "neutral."

When the valve 168 is at the bottom of its stroke or in the "high" position of Figure 26 fluid pressure from 263 is admitted to port 262, and is effective to overcome the force of spring 97 exerted on brake 90, as well as exert pressure upon clutch plates 55—60. Port 260 is effective to drain the manual unit cylinder 292 through port 262 and space 261 when the valve 168 is moved back to the low-speed position.

To the right of preceding described portings, Figure 12, shows a horizontal section taken at 90° to the plane of the preceding section of the manual control valve porting. Port 266 at the extreme right of this section is connected with passage 238, which also feeds servo pressure to port 263 described above. Port 267 leads to passage 274, which delivers fluid pressure to the actuating members of the automatic unit as shown in Figure 11. Ports 268 and 269 are cut through to the external face of valve case 161 and may deliver relieved fluid pressure from the cylinder of the automatic unit and connecting passages as well as from the space back of valve plunger 150.

Figures 12 and 35 show valve plunger 150 for the control of the automatic unit in two different positions; first, in the position where fluid pressure is shown flowing from port 266 to port 267. As long as it remains in the right-hand position the automatic unit will remain in direct drive. In Figure 35 the valve plunger 150 is shown in the left-hand position, where fluid pressure from the cylinder of the automatic unit is allowed to leak out from port 267 through the space between the abutments of the valve and out the relief port 268 to drain back to the transmission sump. The automatic unit can not ever drive in direct when the valve is in this left-hand position.

The mechanical movement which requires the valve to occupy the described two positions is shown in Figure 15, where loose pin 144 connects the extension of valve 150 external to the case 161 to toggle levers 139. The two-positional action of the toggle mechanism has been described preceding.

Bolts 162 and 163 are used to support valve casing 161 on the face of the casing 2, which embodies the actuating mechanism for both the manual and automatic units. The casing is continuous with the transmission housing, and embodies certain ports which match with the ports described preceding in connection with the valve case 161; namely, 262, 263, 264, 265, 266, and 267. The face of valve case 161 embodies passage 169 leading from port 267 to port 275. Figure 31 shows the ports 273, 277, and 275, which respectively are for servo inlet, reinforcement, and automatic direct drive. Port 272 connects manual unit cylinder 292 with port 262.

Port 273 in the casing is the servo pressure delivery source feeding to channel 270 cut in the inner face of valve case 161 leading to both ports 263 and 266.

Passage 275 is the inlet pressure line which delivers oil from passage 169 to overcome the spring load against piston 281, which moves in the cylinder 282 of the automatic unit.

Slotted in the casing is passage 276 leading to the space behind the pistons of both the automatic and manual units. This port registers with port 265 of valve case 161. (See Fig. 13.)

Likewise drilled in the casing is diagonal passage 277, which registers with valve case outlet port 264. This passage leads to the space behind subpiston 294 as is described in connection with Figures 8 and 35.

Valve 168 is moved vertically through lever 157 pivoted at 158, and is free to follow the movement imposed by pin 159 in following cam slot 155 of cam plate 126 as lever 151 is rocked about the axis of shaft 152. The only interval in which this free movement of valve 168 may be interrupted is through the intersection of lever 167 and its curved stop 167', which may at high governor speeds prevent the shifting of valve 168 to low-speed position from direct drive position through the agency of pin 234 fixed to lever 160. This definitely locks the valve-shift movement until the governor speed has fallen sufficiently far to release stop 167' from pin 234, whereupon the vehicle driver may resume hand control. The purpose of this arrangement is to prevent abuse of the driving mechanism.

Clutch feed lines 278 and 279 are shown in the section view of Figure 9. An extension web 289 of the casing 2 encloses the shaft 21, and lines 278 and 279 terminate in drilled passages 287 and 288 in web 289, which lead to passages 79 and 79' of both units. Flanges 380 and 381 of web 289, with packing 382 form glands to reduce loss of oil pressure.

The passage of clutch fluid pressure from cylinder 282 of the automatic unit then flows through 278, 287, and 79 to cylinders 71 in drum 28. Likewise the flow from cylinder 292 of the manual unit passes through 279, 288, and 79' to cylinders 75 of drum 39.

Servo actuating mechanism

Figure 8 is a transverse vertical section through the transmission assembly. Drum 39 of the manual unit is shown in position to be gripped by brake band 90, the fixed end of which, 91, is restrained from clockwise movement by adjustable bolt 92 through the extension of housing 2. The movable end 93 of band 90 is positioned by the upper end of piston rod 290, which is attached to piston 291 fitting into cylindrical recess 292 in the housing 2. Springs 97 and 97' bear against the piston 291 in a direction to cause brake band 90 to grip drum 39 being supported by base plate 293. Subpiston 294 slides in secondary recess 295 when fluid pressure is applied for down shift, low speed drive, or reverse as described preceding. The three conditions of operation of this structure are; first, fluid pressure may be introduced above the head of piston 291 to counteract the force of springs 97 and 97' and thereby release brake band 90 from drum 39; second, fluid pressure admitted to subpiston cylinder 295 may augment the gripping force of band 90 finished by springs 97 and 97'; and third, fluid pressure may work simultaneously behind both pistons 291 and 294, reinforcing these springs when the car driver desires to proceed in reverse gear.

The necessity for the latter over-all reinforcement is to overcome any self-actuating rejection forces caused by the retrograde rotation of drum 39, as will be apparent from study of the directional torques involved in reverse drive.

The construction of the brake bands 80 and 90 themselves is of interest, in that as used in this transmission they are especially contoured and designed to accommodate the directional torque requirements. This construction is shown in Figure 8, where fitting 296 is attached to the ends of spiral band 90a by countersunk rivets. Socket 90b is cut to receive the end of the rod 290. The direction of wrap of the band of the automatic unit, in this case band 80, is in a left-hand spiral, and the direction of wrap of band 90 of the manual unit is in a right-hand spiral. This construction enables one to combine the actuating mechanism in a centrally located control housing for the operating mechanism, both being organized on an interlocking basis. End 80b corresponds to 90b.

It will be noted that, for example, when both units are in direct drive and the mechanism is caused to establish low speed drive in the front or automatic unit, that a certain degree of rejection force of the movable end of 83 of the band 80 takes place when spring 87 is permitted to exert its force in a direction to endeavor to lock the bank to the drum 28. This takes place continuously until the drum is brought to zero speed, after which retrograde movement brings into effect self-wrapping action more or less proportional to the coefficient of friction and to the forces involved. The net result of this action is to friction-synchronize the drum for zero speed, thereby establishing reduction drive through the gearing at the instant the drum ceases to rotate. Equivalent action takes place under similar circumstances when the direct drive clutch 55—60 of the manual unit is released and the brake band 90 energised by springs 97 for locking the drum 39. We therefore have in both units self-synchronizing means, both of which may be made active by shift of hand lever 301 to "low" position under certain operation conditions.

Manual shift controls

The bracket 304 is shown attached to the steering column in Figure 2, forming a bearing for shaft 305 and a mount for sector latch plate 315 and indicator plate 302. Handlever 301 attached to shaft 305 swings in an arc, its latch button 316 and latch rod 317 moving longitudinally within one end of the lever. The notches 313, 314, 318 and 319 correspond to "high," "low," "neutral" and "reverse" respectively. Spring 323 tends to seat roller 324 attached to rod 317 against the notches as in my previous application U. S. S. N. 747,386 filed October 8, 1934. In Figure 3, an extra notch 313' is shown for the enforced 3rd shift described later in these specifications, and 302' is the modified indicator plate.

Reciprocating motion of the lever results in corresponding reciprocation of the shifter rod 308, pivots 309, 311 of lever 109, rod 310, and pivot 153 of lever 151, as seen in Figures 1 and 35.

To clarify the description, Figures 28 and 35 show the cam plate 126 marked with captions. In Figure 35, the relative positions of pin 159 in slot 155 are given as "Rev.," "Neut.," "Low," and "High." In Figure 28, the extra mark "3rd" on plate 126 indicates the enforced third speed shift position. In practice these gauge marks may be used to assist service adjustment.

Governor drive

The transverse section of the governor mechanism is shown in Figures 5 and 29, the gear 240 fixed to shaft 241 meshing with gear 239 of shaft 8 shown in Figure 4.

The governor shaft 241 is supported in bearings 242 and 243, and carries affixed hub 244. Secured to flanged hub 244 are pins 245, each recessed under the head at 246, to engage spring retainer plate 247. Weight arms 248 are pivoted to hub 244 at 249 and terminate in cam ends 250 and weight ends 251.

External large coil spring 252 rests against plate 247 and fits recessed seat 253 in the flange of hub 244. Internal coil spring 254 likewise rests against retainer plate 247 and presses traveler sleeve 255 to the right in Figure 29. This sleeve 255 is hollowed out to a bearing fit over the spindle end 256 of shaft 241 and may slide freely axially, as thrust by the end of spring 254 acting on flange 259.

At the external end of sleeve 255 collar 257 and washer 258 provide connecting means for the external mechanism to be moved by the governor, as indicated in Figure 15. Normally at rest, the assembly of governor parts is as shown in Figure 29. As applied speed increases, weights 251 of arms 248 swing about pivots 249 and cam ends 250 shift sleeve 255 against the tension of spring 254. When the sleeve has moved a predetermined distance, the score seat 253 of the flange 259 of sleeve 255 abuts end of spring 252, and further increase of applied speed results in weights working against the combined stresses of springs 254 and 252. It will be seen that the relative travel of sleeve 255 for a given speed increment in the latter phase is less than in the prior stage. Variations of governor speed above a predetermined point can create no change in the external control mechanism.

In Figure 35 the collar 257 is arranged to move arm 350 fixed to shaft 351, which latter moves arm 352 pivoted to governor rod 110 at 353. In this way axial motion of sleeve 255 is converted to reciprocating motion of governor rod 110, pivot 112 and rocking of equalizer bar 111 is accomplished.

Accelerator pedal linkage

The relationship of the accelerator pedal and handlever linkage are shown in Figures 1, 15 and 35.

Accelerator pedal 303 is pivoted at 354 on the floorboard of the driver's compartment, and rod 355 is pivoted at 360 so as to be moved freely by the pedal 303. Return spring 357 serves to restore the pedal to minimum throttle position. Connection 363 is to the engine throttle.

Bracket 358 provides a pivot for lever 359, the rod 355 hooking into hole 360, and rod 361 being attached to lever 359' at pivot 362. Depression of the accelerator pedal 303 will therefore exert a thrust on rod 355, lever 359 will swing clockwise, and consequently rod 361 will be pulled toward the left in Figure 35. This action rocks lever 132 through clevis pivot 134 and shaft center 120, causing stop 133 to engage lever 123, and move lever 121 attached to hollow shaft 122 clockwise. Whenever spring 125 is so stressed, the impulse of the driver's foot is exerted to swing lever 116 clockwise, consequently tending to move pin 115 and bar 111 to the left. This is the direction of movement to pull rod 113 of Figure 15 to the left, which may through the toggle mechanism 138-139, snap the valve 150 of the automatic unit into the "low" position. Whenever the accelerator pedal 301 is depressed, the described mechanism then establishes a tendency for valve 150 to "downshift."

The engine carburetor is shown at 364 in Figure 1, where throttle rod 367 is joined to throttle arm 365 at 366, the other end of throttle rod 367 being pivoted to lever 359.

The adjustment at clevis 134 permits the service operator to set the operative relationship between required motion of the pedal 301 for a given effect on the mechanism controlled by rod 361, and that at 366 may be set to determine the movement of arm 365, so that a predetermined relation of throttle position for a given stress of spring 125 may be established, to suit the engine torque-speed curve and the running resistance of the vehicle. The adjustments may be set so as to require any predetermined throttle opening before downshift occurs, and the stop system 129-131, with slot 130 of plate 128 enables the service operator to vary the effect of the throttle motion upon the shift control.

Forced shift controls

An important modification of the control linkage of Figures 15 and 35 is shown in Figure 28. The modification is for the purpose of permitting the vehicle operator to compel drive indefinitely at the driving ratio next below "high," in the present exemplification, in "third."

To accomplish this purpose, I modify lever 126, adding extension 320 to it, and mounting thereon the pin 321 arranged to move in a given arc.

Lever 121' moving integrally with lever 123 about the center of shaft 120, is notched at 322, the arc of movement of this surface being arranged to intersect the movement of pin 321 at a given point.

The cam plate track 155' is lengthened clockwise from that of Figure 15, so that pin 159 which controls the valve 168 of the manual unit will not be affected by the further movement of the lever 151 from "high" to "3rd."

Now when the car operator desires to establish an enforced shift to "3rd" from "high," the handlever 301 is put into the "3rd" position marked on the indicator plate 302' of Figure 3, the rod 310 transferring the movement to lever 151.

The relative position of the cam plate 126 changes from that of Figure 15 to that of Figure 28, and valve pin 159 slides around in slot 155' to "3rd" position. Simultaneously, pin 321 of arm 320 moves counterclockwise intersecting notch 322 of lever 121', and rocking the lever assembly 121-123 clockwise until head 124 abuts stop 129 fixed to the casing.

This action is a duplicate of that occurring when the accelerator pedal is pressed to maximum, open-throttle position. Spring 125 is fully stressed, and transmits a leftward exerted force to lever 116 through stop 117. Pin 115 thereupon tends to pull equalizer lever 111 to the left, and since cam toe 154 of plate 126 no longer can interfere with the movement of lever 116 through pin 118, the momentary positioning of 112 by existing governor speed, establishes 112 as a fulcrum for equalizer bar 111, and pivot point 136 moves left shifting rod 113 and pivot 140 on toggle arm 138 left. This breaks the action of the toggle linkage since the shifting of pivot 140 moves the end 149 of spring 148 past center, and toggle arm 139 is forced to move to the left, thereupon shifting the control valve 150 of the automatic unit to the left. As elsewhere described, this releases the pressure in cylinder 282 and spring 87 of the automatic unit applies brake 80, establishing reduction gear drive in that unit, since fluid pressure is therewith relieved from loading of clutch 33-36.

The automatic "governor versus throttle" shifting action herewith ceases, since the throttle pedal position cannot further influence ratio shift because lever 123 is held flush with stop 129. The governor connected linkage has not, however, been put out of action, but is still able to prevent abuse of engine and transmission, in that at an extreme high speed governor position, corresponding to a predetermined car speed of say, 63 miles per hour, point 112 can move far enough to the left to shift the valve 150 back to "high," or direct drive in the automatic unit.

This yields a selective effect of engine braking and acceleration available to the car driver within definite speed ranges of engine and vehicle, wherein neither engine nor transmission mechanism may be abused, and permits the driver to establish a fixed reduction ratio for gradient work where torque rather than fuel economy is desired.

It will be noted that after an excess speed upshift to "high" compelled by the governor, when the setting is for enforced "3rd" drive; the control mechanism will reset to "3rd" when the governor speed falls, and drive in "3rd" will be resumed, requiring no especial attention from the car driver. Resumption of normal automatic shift in the automatic unit is accomplished by resetting the handlever 301 in its "high" position.

This rotates plate 126 back to the position of Figure 15, and removes pin 321 from intersection with notch 322 of lever 121'.

The motion of the handlever 301 from position 314 to 313 and 313' requires a lost motion provision in the linkage of lever 308 of Figure 35 to shaft 103, lever 102, and slider 104, so that after jaw clutches 7'—19' are meshed, the motion of 301 may be continued. Roller 312 after completing the stroke of slider 104 toward mesh of 7'—19', may ride free of cam face 105 of the slider, so that the lost motion provision is herein accounted for. This is an important feature in that the cost of added lost motion mechanism in the rodding and leverage is dispensed with, in the combination of the two motions of rocking of 102 and the sliding of 104 on rod 101.

Modification—manual unit

In Figures 4 and 8 is shown the construction of the double reduction true planetary gearing unit, but to extend the utility of my invention to types of transmissions fulfilling requirements for differing ranges of speed ratios, I deem the presently described modification showing advisable.

This consists in a transmission unit of the type of the manual unit of my hereinbefore mentioned U. S. S. N. 747,386 filed October 8, 1934, so disposed in the general assembly of the present case, that it conforms to the mechanical and control requirements herein established. The object of this modification is to demonstrate the flexibility of application of my invention, and more particularly, the means by which I retain the advantages of my invention in a different arrangement of gearing, reaction sustaining means and actuating mechanism.

Figure 27 shows the continuation of shaft 21 delivering engine torque or a multiple thereof from the automatic unit to pinion or sun gear 325, meshing with gears 327 of compound planets 326 mounted in the webs 330a—330b of carrier drum 330. Sun gear 329, affixed to the final output shaft 50', meshes with gears 328 of compound planets 326.

The webs 330a and 330b support the shafts 332 on which planets 326 are bearing mounted at 331 and the composite drum 330 is in turn supported on bearing 49 in the web 48 of casing 2, and on bearing 41 on the shaft 21. Prime number items are identical with originals of Figure 4.

The thrust bearing 47 of Figure 4 delivers axial loads between piloted shaft 21 and recessed shaft 50, as in the preceding description of the double reduction unit. Planet pinions or sun gears 325 and 329 are helically cut to a right hand helical angle, and gear teeth 327 and 328 of the compound planets 326 are cut to a left hand helical angle, the thrust pattern being similar to that of Figure 30, and to that of the preceding noted case. This arrangement yields a proper distribution of thrust loads, and a quiet, low-loss gearing arrangement of unusual utility.

Drum 333 embodies fluid pressure cylinders 334 integral with web 330c, and fluid passage 335, as in the construction of the double-reduction unit of Figure 4. Clutch plates 337 splined on hub 336 keyed to shaft 21 furnish the direct drive torque, and mating clutch plates 338 keyed on bolts 339 constitute the receiving members for the couple, presser plate 340 transferring the thrust of pistons 341 mounted in cylinders 334 to the plates, when direct drive is desired. Clutch release springs are shown at 345.

Brake band 342 identical with band 90 of the previously described double-reduction unit, is anchored to the casing, and its movable end corresponds with end 90b of band 90 of Figure 8.

The actuating means for this unit correspond in every way with the showing of Figures 8 and 11 and duplication of their function at this point is not believed necessary. Operation is therefore similar, but the ratio ranges available from the use of this form of gearing are in a different class from those of the double reduction unit. Furthermore, this unit is not a true planetary, since when brake 342 is locked to drum 333 there is no planetating action of the gearing but a strictly countergear action. This unit then is a rotatable reactor type, as distinct from one in which definite planetary rotation occurs under torque. The only time the present unit "planetates" is when the transfer from one driving condition to another takes place, i. e., during the change speed interval.

Clarification of these points among those skilled in the art is desirable in that many actuation-control mechanisms useful in one type are definitely non-applicable in the other. My disclosures herewith describe the applicability of my invention to both types, which gives to the public a choice of use over a wider range of work requirements.

Overall thrust diagram

Figure 32 is a schematic sectional elevation of the elements involved in the distribution of torque thrust resulting from the use of helical cut gearing. As explained preceding, in the automatic unit, the sleeve 26 receives a thrust to the left from sun pinion 25, delivered to shaft 21 through thrust washer 94. Shaft 8 receives a thrust to the right because of the inclination of the teeth at 12—24. Simultaneously, interaction between helical splines 9 of shaft 8 and gearbody 19 provides a thrust to the left, tending to counterbalance the preceding noted thrust, therefore a residue only is taken at bearing 6 through thrust bearing 10' and shaft 5. Parts of bearing 47 are shown at a, b, and c.

In the manual unit, sun gears 37—38 endeavor to move to the left, adding to the thrust on thrust bearing 47. Thrusts on reaction annulus gears 52 and 42 are to the right, but thrust washer 66 transmits a part of this effort to carrier 45, thrust bearing 47 acting to compensate; and thrust washer 65 delivering thrusts from annulus 51 to shaft 21 through thrust washer 65, ring 54 and clutch hub 59, also establishing a degree of compensation. On the overrun, clamped washer 70 transmits opposite thrusts to bearing 49 from drum 39, and thrust washer 64 limits leftward movement of 51—52—54.

In the forward-reverse unit, the teeth 7' of input gear 7 are cut to a left hand helix, to mesh with the teeth 19' of slider gear 19, to form the means to drive in direct. Gear 19 is helically splined to shaft 8, the splines being cut to a left hand helix, corresponding to the helical cut of the teeth of 19' and 7'.

This arrangement causes a thrust to be exerted so as to press gear 7 and shaft 5 to the right as in Figure 32, and shaft 8 receives an opposite thrust which is delivered through thrust bearing 47 to shaft 50 and through bearing 49 to web 48 at the rear of the transmission assembly.

The external teeth of gear 7 are cut to a right hand helix and mesh with countergear 16, cut to a left hand helix, so that when the reverse train is driving the gear 7 is urged to the left, putting a thrust on thrust bearing 10'. The countergear unit 16—17 is supported in its bearings for longitudinal movement. At the point of mesh between 17 and reverse idler 18, the latter receives a thrust to the right; between 18 and 19 the thrust on 18 is to the left, tending to counterbalance the thrust received because of the drive of 17. The net thrust on 19 is to the right at the point of contact with 18, but because of the helical cut of the left hand spline teeth of shaft 8 on which 19 is mounted, this tendency is counterbalanced. Net thrust in this unit is therefore toward the engine, exerted on bearing 10' and on bearing 6 when driving in reverse.

Operation

Starting the vehicle

The car operator starts his engine, which idles at a given speed. The main clutch pedal 300 need not be depressed, since the handlever 301 in the neutral position separates the spinning clutch disc and driven gearing from the final drive. In this condition, the operator may remain for as many minutes as are necessary to warm up the engine, the servo pump gear 20 circulating the transmission case oil through the described passages.

When it is desired to put the vehicle in motion, the clutch pedal 300, depressed by the foot, separates the mating clutch plates, the operator thereupon shifting the handlever 301 to correspond to "neutral" to "low" shift of plate 126 of Figure 35. At this point attention is directed to a valuable adjunct for absorbing the inertia of the main clutch driven plate, and connected parts. In my construction, the arrangement of clutch driven shaft 5, gears 7 and 16, and servo pump 20, and automatic pressure valve 200, provides a predetermined back pressure when drive is removed from this system by opening of the main clutch.

The effect of spring 201 in compelling valve 200 to occupy a position such that developed pump pressures work against the head of the transmission lines, and thereupon continue to cause oil to flow through the transmission bearings, provides a useful means to pace the inertia absorption to the synchronization requirements, to achieve the net result of a smooth transition from neutral to "low," so that jaw clutch 7' will reduce to zero speed very quickly. Further protection of this shift system is afforded by the chamfer of the teeth of both jaws 7' and 19' in a left hand direction. From the well-known overrunning effect of inclined-tooth meshing clutches, it will be seen that with the main clutch engaged, the gearbody 19 has zero rotation, and gearbody 7 has engine rotation, and the bringing of the two together under these conditions would tend to cause the teeth 19' to reject mesh with the teeth of 7'. This rejection action continues until gearbody 7 is brought to zero speed by the braking reaction of the pump gear 20 and system which it feeds.

Then there are these fulfilled functions in the neutral-to-low shift:

1. Braking action of pump 20.
2. Mesh rejection of 7'—19'.

One acts to establish synchronism-tending forces which cease to act when the inertias are absorbed the other simultaneously prevents mesh until the first function has been completed.

Assuming that forward drive has been synchronized, let us examine the operating conditions in the remainder of the driving system. As soon as the driver relaxes the main clutch pedal, engine torque is delivered to shaft 8, and to the input annulus gear 12 of the automatic unit. The car load is assumed to be acting on carrier element 22 connected to shaft 21 which is the output shaft of the automatic unit.

With load on carrier 22, the engine torque on gear 12, a force is applied to the sun gear 25 tending to give it a retrograde rotation, as shown by the arrow in Figure 10.

Brake band 80 of the automatic unit being normally stressed for locking by the springs 87, is so wound and anchored that slight retrograde motion of drum 28 tends to cause the band to self-energise, assisting locking against further retrograde motion.

This then establishes a reaction, gear 25 cannot further rotate, and cage 22 moves in the same direction as the engine connected gear, the planets 24 moving orbitally as well as rotationally, shaft 21 being driven at a ratio to engine speed, forwardly.

In the manual unit, brake band 90 is so anchored and wound as to be self-energising for retrograde rotation. Sun gears 37 and 38 transmit the rotation of shaft 21 to both planets 43 and 44. In the first part of this unit, the sungear 38 drives the planets 44 reversely on spindle 53, and annulus 42 being held by brake band 90, receives a retrograde reaction. Reduced forward motion is imparted to spindles 53 which being integral with annulus 51 of the second part of the unit, cause annulus 51 to have equal reduced forward rotation. Now sungear 37 is simultaneously driving planets 43 to revolve reversely on spindles 46, and if it be considered for a moment that if annulus 51 be held from rotation by a non-existing brake, carrier 45 and shaft 50 would have a certain net reduced forward speed, the annulus 51 taking a retrograde reaction.

Instead of the annulus 51 being held, it has a forward speed component derived from carrier 52 of the first part of the unit, therefore the net rotation of carrier 45 is modified to a speed, compounded from the motions imparted through sungear 37 and annulus 51. For example, if the net reduction of the second part of this unit comprising sungear 37, planet 43, annulus 51 and carrier 45 be estimated at 4 to 1; and the reduction increment applied through annulus 51 by the first part of the unit be approximately 5 to 1; the compounded net speed of carrier 45 and shaft 50 will be ¼ plus ⅕; (9/20) or 1 to 2.25.

This general type of gearing is known in the art as a double reduction planetary, and in the presently demonstrated device, the brake reaction, as described, on band 90 is retrograde, or in a direction opposite to the normal rotation of the engine. Figure 35 provides means to follow the operation of the controls.

Low gear drive

Then with springs 97 active to load band 90 for locking, the application of engine torque to shaft 21 and load to shaft 50 gives drum 39 a reverse reaction which drags movable end 93 of band 90, and self-energization takes place. Shaft 50 will then apply torque to the final drive mechanism such as road wheels, tractor treads, air or ship propellers and the like; at low speed ratio, or reduction in both the automatic and manual units.

Overrunning torque when the throttle is relaxed, or when the load is driving the engine as on downgrades, will cause the free ends of both bands 80 and 90 to tend to de-energize or release, so that coasting might occur, and drag the bands on the drums.

This is prevented by the application of spring reinforcing fluid pressure to subpiston 294 of Figure 35, the handlever 301 controlling valve 168 through the linkage shown, so that ports 263 and 264 are connected whenever the handlever 301 is placed in the "low" forward position. The subpiston also serves an additional purpose.

A similar sub-piston may be used to reinforce the spring 87 of the automatic unit brake 80, but in practice, with the projected gear ratios, car loads and engine torques, this expedient is not necessary, although it is within the scope of my invention to utilize such reinforcement means when needed.

Overrunning torque then may be prevented from skidding the brakes by reinforcement of the brakes through fluid pressure, at the control of the car operator. This eliminates any possibility of coasting or free-wheeling, and increases the factor of positive control under severe operating conditions, therefore decreasing hazard. Engine braking in low gear is desirable from the point of view of maneuver-ability in traffic, since a more refined control over the slow speed positioning of the vahicle is subject directly to accelerator pedal 303.

The idling gears are protected from racing during the forward driving speed change interval, since a slight torque is always being delivered through brakes 80—90 or clutches 33—36; 55—60. Excess speeds of annulus 51, for example, could destroy bearings 40—41, unless the feature were used.

Automatic "low"

The driver may now run at will with "low" setting of lever 301 and still obtain the advantages of automatic operation. Governor 251—255 through connections 350, 351, 352 and 110 may exert an influence on the ratio control mechanism of Figure 35. Here the equalizer bar 111, on increasing governor speeds is urged to move left and to swing counterclockwise about 115 as a fulcrum. At a given governor speed, equivalent to engine speed, the pivot point 112 of bar 111 shifts left, lever link 113 shifts right, and the toggle 138—139 snaps from left to right bias, causing valve 150 to move to a position to connect ports 266 and 267. This delivers fluid pressure from main outlet 238 of the servo pump and automatic valve system of Figures 4 and 19, to the head of piston 281 in cylinder 282 of the automatic unit, and to passages 278 and 79 leading to pistons 72 in cylinders 71 of this unit.

Piston 281 overcomes the pressure of spring 87 and disengages brake 80. Pistons 72 load presser plate 74 and press the clutch discs 33—36 together, squeezing the clutch disengaging springs 88.

The transition from low to direct in the automatic unit has been made, and the ratio of drive is the reduction ratio of the manual unit only.

For conditions requiring acceleration, maneuvering, or unusual torque demand, the handlever may be kept in the "low" position indefinitely and the mechanism will select upshift only in the automatic unit depending on governor speed and throttle pedal position, the latter providing means to affect selection through the linkage 303, 355, 369, 359', and 361 of Figure 35, and through lever 132, stop 133, arm 123, arm 121 and spring 125, which latter forces lever 116 and pin 115 to the most leftward position allowed by pin 118 bearing against the arm of lever 126.

This interaction is so arranged that for normal operation while in "low" setting of handlever 301, the movement of pin 115 to maximum allowed left position can force the automatic shift to "low" within the low speed ranges of the governor only, which is a protection against unnecessary, long-continued operation in the extreme low ratio gearing.

Furthermore, the cam slot 127 so limits clockwise motion of lever 116 about shaft 120, that as soon as the automatic unit shifts by governor action to direct, the increase in governor speed resulting from the opened throttle carries pivot 112 to the left so far that the permitted maximum leftward movement of 115 is not far enough for the driver, even by full depression of the accelerator pedal 303 to enforce a downshift in the automatic unit.

Now if severe driving conditions or up-grades be met, the governor speeds may be reduced far enough so that the mechanism will be urged toward downshift.

This speed range of control is governor managed up to 12 miles per hour, not obedient to operator will to shift to a higher ratio.

One may determine this speed range by varying the strengths and adjustment of governor springs 252—254, spring 125, biasing spring 141 and toggle spring 148, and the setting of stud 96 in slot 130 of plate 128; the position of lockscrew 129, and the effective lengths of rods 361 and 110 in their screw clevises. At descending governor speeds above car speeds of 8 miles per hour, this setting requires the automatic unit to remain in direct drive, under normal operating conditions, although these requirements will vary for different vehicles, purposes, engine speed and power available, and the like.

In the above we have considered the automatic operation in one ratio range. Now we will examine the operation in the second range as noted preceding.

Shift to "high"

The car operator in shifting the handlever 301 to "high" position, may fulfill one of the objectives stated in the preamble to this specification, which is to cause a simultaneous shift in both the automatic and manual units, so as to provide a smooth transition from one ratio to an adjacent step.

It will be noted that after the pin 118 departs from the slot 127 of cam plate 126, when the handlever 301 is put in "high" position, the lever 116 being pressed to the left by spring 125 is not further restrained, and for given governor and throttle settings, may cause the valve 150 to be moved to "low" position, approximately at the same time as the valve 168 is shifted to its "high" position. This is true, however, within a limited established governor range, and at or nearly full throttle pedal position of 303.

At increased governor speeds with relaxed throttle, since there is no need for the mechanical advantage of the reduction speed interval of 3rd, this downshift will not occur in the automatic unit, when the handlever 301 is moved from "low" to "high," so that considering overall ratios, the operator will skip 3rd speed, and shift from 2nd to direct; that is, the valve 168 only will move.

Automatic "high"

The car operator after shifting to handlever position 313, now enters the new regime of control. With the handlever 301 in "high," the alternation of direct and reduction drive is at the control of the combined effect of governor speed and throttle position all the way up to a governor speed corresponding for example to 59 miles per hour, beyond which the affect of the throttle pedal 303 can no longer enforce a shift to 3rd, or to reduction in the automatic unit.

Full depression of the accelerator pedal 303 when driving at below 59 miles per hour causes the arm 116 to move left using pivot 112 as a momentary fulcrum, and move link lever 113 left, snapping toggle 138-139 left, and shifting valve 150 left, closing port 266 and opening ports 268-269 connecting port 267 to the sump. This drains clutch cylinders 71, line 278 cylinder 282 and line 274; springs 87 applying brake 80 to drum 28; eventually stopping the rotation of the drum, and sungear 25 which serves as the reaction element for the gearing of the automatic unit, establishing thereupon the reduction drive.

Overspeed "high"

At all governor speeds above 59 miles per hour, the pivot point 112 is moved too far left for the pin 115 to further enforce a downshift, since lever 116 is receiving the maximum effort deliverable by spring 125; the lever system 121-123 being prevented from further clockwise rotation by stop screw 129.

When the speed drifts below the given 59 miles per hour point, the ability of pin 115 to enforce a downshift is resumed, as will be understood from the foregoing description.

Automatic shift range

On severe up-grades which impose a heavy torque demand on the engine, registered as a decrease in governor speed, and with open throttle recording the operator's desire for forward car movement, the downshift will occur within a definite speed range such that smooth transition from direct to reduction in the automatic unit occurs, and such that the available torque is in general proportional to the requirements. On level roads, the relative points of pivots 112 and 115 as mutually acting fulcra will therefore determine a different response, measured by the engine's ability to sustain a given speed for the existing load, conditioned by the accelerator pedal position. On downgrades, with relaxed throttle, the governor action causes the automatic unit to go to direct drive and remain there over all driving speed ranges above a predetermined and selected point of 17 miles per hour. In the range of 17-59 miles an hour it is possible for the car driver to establish a downshift through acceleration demand set up by depressing the accelerator pedal 303.

Governor lockout of manual unit

While it is useful for the governor mechanism to prevent a downshift in the automatic unit above a predetermined speed of 59 miles per hour, for example, it is just as useful to apply a similar safeguard to the manual unit. The construction of Figure 11 shows rod 135 pivoted at 112 to the governor operated rod 110, and to lever 167 pivoted on valve casing 161 at 166. Lever 167 is arranged to intersect lever 160 at pin 234, through lug 167', so that for governor speeds in excess of a predetermined speed, for example, 40 miles per hour, a shift of handlever 301 to "low" will not move valve 168.

If this be attempted, pin 234 locks against 167', and while the handlever itself may be moved, the resistance of spring 181 is felt against the hand, and the lever 157 will move counterclockwise stressing that spring without moving the valve 168.

The reaction of governor springs 252 and 254 in the system comprising 255, collar 257, arm 350, shaft 351, arm 352, rod 110, and slot of lever 111 provides a yieldable system between weights 250, and the control parts moved by accelerator pedal 303 and handlever 301, of unusual value. It will be noted that any governor force transmitted back through the control linkage to the accelerator pedal 303, must pass through spring 125, therefore the operator can only feel that force up to the limit of the designed compression force of the spring.

The travel of lever 132 with respect to lever 123 from idling engine throttle position to the point where lug 133 begins to cause 123 to rock clockwise provides a range of exclusive engine throttle control for pedal 303 which may be adjusted to the power requirements, and guarantees a sufficient development of torque before the automatic control interaction can be initiated. Beyond this point, the range of pedal movement is always involved with change of ratio except for the described and enumerated checks and stops.

Manual downshift

The driver may shift the handlever 301 from "high" to "low" position at any time, except when the governor is at high speed positions as noted above. When this is done, valve 168 of the manual unit is moved down as in Figure 35, connecting ports 263 and 264, and venting port 261, line 272, cylinder 292, line 279, and cylinders 75 of the manual unit. When the pedal is depressed, the toe of cam slot 127 is rotated to intersect pin 118 and force arm 116 to move counterclockwise against spring 125, causing pin 115 to take a position toward the right as in Figure 35, restoring the relationship between pin 115 and slot 114, again limiting the leftward point where the throttle pedal forces might exert an influence for downshift. If the shift is made above 17 miles per hour with pedal relaxed, pin 118 is already above 127. When the handlever 301 is placed in the neutral position, the gear 19 and teeth 19' slide to a non-driving point.

Reverse shift

For shifting to reverse, the clutch pedal 303 is depressed, applying the fluid pressure load of the pump and lubrication system as previously described, to absorb the inertias of the rotating parts, and gear 19 is moved along helical splines 9 from left to right as in Figure 4 (see also Figuse 6).

The slider 104 through notch or seat 370 picks up the head of lever 371 pivoted at 372 on the casing, and the lower end 373 of lever 371 moves reverse idler gear 18 from left to right or oppositely to sliding gear 19. These motions are simultaneous, and the gears 18 and 19 come into mesh slightly before gear 18 engages countershaft gear 17. This form of gear engagement is believed novel. It is known to be old to draw two meshable gears on parallel centers together, but it is believed new to mesh one of the two in the same motion with a third gear on a parallel center.

This construction and operation provides a quiet, easy meshing of the reverse train, composed of low inertia elements. It reduces churning losses, in that for all neutral or forward running, the reverse idler gear is not in mesh with any gear, but is a true static idler, and does not rotate at all, therefore developing no heat in the oil.

In shifting from reverse to neutral, the reverse gear 18 is successively demeshed from 17 and 19, and it will be noted that for a given movement of the shifter, the stroke for effecting mesh or demeshing is half that required for directly connected shifter mechanism used in present day automotive vehicles.

For ordinary passenger car work it is desired that drive in reverse shall be at only one reduction speed, whereas in tractors, draft gear, logging engines, locomotives, excavators and the like it may be useful to arrange the transmission and controls so that the same range of variable speed ratios are available in forward and reverse drive. The present application relates more particularly to passenger vehicles in the examples and demonstration. Therefore I show means to prevent the automatic shift from taking place when the handlever 301 is put in "reverse", and since the pin 159 working in cam slot 155 is so placed that fluid pressure is reinforcing the brake springs of both the automatic and manual units, drive can only be in reverse, at low ratios in both units.

When cam plate 126 is in the "reverse" position, finger 156 swings so as to prevent arm 139 and weight pivot 145 from moving to the right, preventing valve 150 from being moved to the right to direct drive position for the automatic unit. The governor and throttle linkage cannot through rod 113 and lever 138 operate toggle 138—139 (Figure 35) when valve 150 is locked in "low" position. As soon as the handlever is moved from "reverse" finger 156 no longer restrains arm 139.

If an automatic increase in ratio is desired for reverse, finger 156 may be omitted from the construction, and at a given governor speed, the automatic unit will change from low to direct drive. During reverse shift, the cam plate 126 through slot 155 guides pin 159 of lever 157 to rock lever 160 to its limit of clockwise travel. This lifts valve 168 so that servo pressure from line 233 through port 263 may flow to port 265, line 276, into the spaces behind both pistons 281—291, reinforcing their respective springs. This overcomes any tendency for reverse torque to de-energise the brakes 80 or 90.

*Control diagram*

An example of a characteristic control regime is given in the diagram of Figure 34, which demonstrates the unique character of the interlocking controls of my invention. The first two lines AU—AV to the left labeled "automatic low" and "automatic high" show the relationship between engine and car speeds when the manual unit is in "low," the line AV showing the relationship when the automatic unit is in "high." The shaded area includes the speeds over which accelerator pedal and governor action are effective to shift the automatic unit.

Visualizing the vehicle initially in motion, one will note that opening the throttle and increasing car speed from A to O to P, the governor will at part throttle shift the automatic unit to "high" at an engine speed of about 1600 R. P. M. and a car speed of 12 miles per hour at point P. However, if the accelerator pedal is pushed to the floorboard, that shift will not take place until the engine speed goes up to 3000 R. P. M., or a car speed of 23 miles per hour, determined by the governor, or at point Q. Now following the upshift arrow Q—T and the "automatic high" line from T to S to R, we find that the unit can remain in "high" until about 8 miles per hour, when the governor drops ratio to low. The area O—P—S—R represents the loop in the governor action without which excessive hunting would prevent satisfactory operation. The line P—Q describes the speed ranges in which the throttle pedal position can influence change of ratio "up." The throttle pedal cannot change ratio down in this regime, or influence a downshift, because of pin 118 of Figure 33 engaging cam slot 127 of cam plate 126 when the handlever 301 is in "low."

When the handlever is shifted to "high", a new relationship between engine and car speed is established. We therefore have two new lines AD and AH which replace AV and AU of the preceding relation. It should be remembered that handshift trips the automatic unit back to reduction gear, or low, when moved to shift the manual unit to "high." Now if we move the vehicle forward, we find that at point C on line AD, the governor will shift ratio up to direct drive of the automatic unit, at an engine speed of about 1600 R. P. M., as before, but at a new car speed of 27 miles per hour, with part throttle setting.

If the accelerator pedal is pushed to the floorboards, the operator can delay this shift "up" at will to point D or to about 63 miles per hour, or 4000 R. P. M., of the engine. At this point the governor takes complete charge, and enforces the shift as expressed by line DE. Retracing on AH from E to G, we find that the governor alone, at relaxed accelerator pedal setting will cause a shift to low of the automatic unit at 17 miles per hour, about 800 R. P. M. of the engine, as indicated at arrow GB. The area B—C—F—G represents the governor loop, similar to O—P—S—R. The lines C—D and K—F represent the speeds over which the accelerator pedal action is effective to influence ratio change. Point D is at a higher speed than Q because a separate influence is exerted on the positioning of point 115 with respect to 112, by pin 118 and cam slot 127 of lever 126, of Figure 33, when the handlever is set in "low" position, not present when it is in "high" position.

Line JK, parallel to and left of DE determines the loop action of the governor in the corresponding speed ranges, which prevents hunting at the compelled high speed point E, so that after a governor compelled upshift along DE, depression of the throttle pedal cannot cause a downshift until the car speed has dropped to about 59 miles per hour, or to point K.

The diagram is only explanatory, and will vary with design of power plant, load and transmission, but it demonstrates the principles of my invention in automatic controls for two range transmissions, and for establishing zones of speeds in which governor alone may control ratio as against zones in which conjoint governor-throttle action is had.

The utility of my invention is in no way circumscribed to the demonstration herewith given, i. e., an automobile power control device, but its applicability to excavators, hoists, tractors and similar machines, machine tool drive, power shafting of boats, rail cars, and aeronautical vehicles is expressly stated herewith. The scope of my invention will be apparent in the statements of the following claims.

I claim:

1. In a device of the character described, an engine; an engine throttle, a driving member connected to said engine, a driven member, a fluid-pressure-engaged friction clutch for establishing a direct driving coupling between said members including axially movable plates, gearing adapted to transmit torque between said members when said clutch is engaged, actuating means for connecting the driving and driven members through said gearing operative to initiate release of said clutch while connecting said members through said gearing in such a manner that a driving torque connection is constantly maintained between said members, and speed responsive means coacting with said throttle effective to select actuation of said clutch over a predetermined speed range.

2. An engine, an operator-controlled engine throttle, a driving shaft, a driven shaft, variable ratio gearing adapted to transmit the drive between said shafts, a fluid pressure-engaged coupling effective to establish drive between the shafts and through said gearing, a speed ratio actuating member, auxiliary power means continuously operative to move said member, a two-position speed ratio selector operative to control said means, a device movable by changes in the speed of one of the shafts and by variations in the motion of said throttle to position said selector, and means for shifting the driving ratio of said gearing operable at the will of the operator to inhibit the action of said device.

3. In a power control mechanism, in combination, an engine, a throttle therefor, a variable-speed power transmission, fluid pressure-engaged speed ratio changing means for the transmission, an auxiliary power device for actuating said means, a governor, movable control means connected to said throttle and to said governor coacting to position said speed ratio changing means, and separate control means for said transmission effective upon said movable control means to compel shift to a selected speed ratio of said speed ratio changing means against the selection action of said movable control means.

4. In combination, an accelerator controlled engine, a power transmission device including a fluid pressure sustained coupling, a speed ratio control mechanism therefore operatively connected with said engine comprising means responsive to said throttle position and said engine speed movable to one of two positive positions, said means comprising jointly and independently operable coacting mechanisms movable relatively to each other for selection of speed ratio, and additional means manually operable to prevent positioning of said means at the will of the operator.

5. In a transmission mechanism for a vehicle, in combination, a driving shaft, a driven shaft, friction clutch means effective to connect said shafts in direct drive, gearing means operative to connect said shafts in indirect drive, friction means effective to establish reaction in said gearing whereby torque is transmitted between the shafts, a device normally active to energise said means, and auxiliary power means effective to reinforce the action of said device at the will of the operator.

6. In a transmission mechanism for an engine-driven vehicle, in combination, a driving shaft, a driven shaft, a friction clutch operable to couple said shafts indirectly through gearing, multiple pistons rotating with one member of said clutch effective to cause the clutch to transmit torque, release means rotating with one member of said clutch effective to disengage said clutch, a single port delivering fluid pressure to said pistons and also acting as a relief port, a non-rotating gland surrounding one of said shafts operative to transfer pressure to and from said port, an externally connecting fluid pressure line connected to said gland, and a valve effective in one position to relieve fluid pressure from said line.

7. In fluid pressure pumps for lubrication and for servo supply systems, in combination, a lubricating pump, a variable speed ratio gearing, a transmission housing for said gearing, a heat exchanger mounted in said housing connected to the suction side of said pump, a lubricant inlet to said heat exchanger, coolant circulating means in said heat exchanger, inlet and outlet fittings in the heat exchanger for said coolant, and flexible tube interconnections between said engine cooling system and said fittings permitting relative motion between said system and said heat exchanger.

8. In pressure pump devices for lubrication and fluid pressure supply systems in combination, a pressure pump having a suction space and a pressure space, a housing for said pump, fluid storage means, a heat exchanger attached to the pump housing adjacent the said suction space, a conduit connecting said means and said heat exchanger, a coolant circulable in said heat exchanger, and porting arranged to maintain the degree of pressure existing in said conduit substantially lower than the degree of pressure existing in said suction space, under all operating circumstances.

9. In power actuated variable speed gearing, in combination, a servo pump driven by said engine, a first pressure conduit from said pump connected to said speed ratio actuating means, a second pressure conduit from said pump connected to said transmission lubrication means, and an automatic pressure valve effective to deliver lubricant to said second conduit while acting to limit pressures within said first conduit for given low speeds of said engine.

10. In controls for variable speed transmissions, in combination, a fluid pressure actuated speed-ratio changing servo device, a selector valve therefor movable into two positions, compelling mechanism operative to cause positive positioning of said valve in either of said positions, automatic selecting means operative upon said mechanism, and a rotatable stop effective to inhibit movement of said mechanism upon predetermined settings of said stop.

11. In variable speed gearing controls, in combination, a manually operable speed-ratio selector mechanism embodying a hand lever, a link member connected to said lever, a valve arm, a valve movable by said arm, a movable camplate operative to transmit positional movements of said member to said arm, a second valve normally effective to actuate speed ratio automatically, and a cam integral with said plate operative to inhibit movement of said second valve for given settings of said hand lever.

12. In power controls for self-propelled vehicles, in combination, an engine, a speed control pedal for said engine, a power shaft and a load shaft, gearing interposed therebetween embodying a reaction element, a reaction sustaining means selectively effective upon said element, a torque path through said gearing establishable by said means, a second torque path constituting a coupling wherein relative motion of said gearing is prevented, means normally active to bias said reaction sustaining means and thereby establish drive through said first named torque path, a fluid pressure motor connected to said means, a fluid pressure motor connected to said coupling, and valve means movable by said pedal simultaneously operative to admit or release fluid pressure to or from said means and to or from said coupling, whereby alternate torque paths through said gearing or through said coupling may be established.

13. In automatic control mechanism for power-propelled vehicles, in combination, an engine, a speed control accelerator for said engine, a power shaft driven by said engine, a load shaft, variable speed transmission gearing connecting said shafts embodying friction torque-carrying elements, fluid pressure servo means made operative by rotation of said engine, a speed responsive device made operative by rotation of said engine, actuation means for said gearing connected to said means, relative motion mechanism correlating movements of said accelerator and said device effective to select settings of said first named means, and means made operative by said selection movements of said mechanism wherein the fluid pressure of said servo means is effective to hold said elements in engagement.

14. In power transmission devices, in combination, two coacting planetary helical gear groups each embodying input, output and torque reaction sustaining elements, a compound torque sustaining device comprising the carrier of one group and the torque reaction element of the second group, a power shaft connected to input driving geared elements of both groups, a load shaft connected to the carrier of the second group, means operative to vary the rotation of the reaction sustaining element of the first group effective to establish the flow of torque from power shaft to load shaft through said helical gearing, and thrust supporting means associated with said shafts effective to absorb by cancellation axial loads resulting from torque carried by said helical gearing.

15. In power transmission gearing in combination, an input shaft element, an output shaft element, an intermediate gear carrying element, two helically toothed pinions cut to the same hand of rotation and commonly rotatable with one of said elements, gearing intermeshing with said pinions arranged to transmit torque between said first named two elements, and drive transmitting means effective to connect said two elements when said gearing is ineffective to transmit torque therebetween.

16. In planetary gearing, in combination, a shaft, two pinions fixed to said shaft toothed helically to the same hand of rotation, a carrier affording a mounting for planet gears meshing with one of said pinions and adapted to drive a load shaft, a helically toothed element meshed with said gears and receiving drive through the other of said pinions through an intermediate element, and thrust bearing means between said load shaft and said carrier adapted to absorb selectively compression forces existing between said shaft and said carrier.

17. In power transmission gearing, in combination, a power shaft, a rotatable gear carrier adapted to drive a load shaft, a drum adapted to establish driving reaction through gear teeth integral therewith, a gear casing, a bearing interposed between said load shaft and said carrier adapted to transmit compressional force therebetween, a second bearing between said carrier and said drum adapted to transmit compressional force therebetween, a second carrier, abutments integral with said shaft, bearings between said second carrier and said abutments adapted to transmit compressional force in either direction therebetween, and a bearing mounted between one web of said casing and an abutment of said first named carrier adapted to transmit compressional force therebetween.

18. In double reduction gearing, in combination, a driving element, a driven element, helically toothed sun gearing fixed to one of said elements, a planet carrier connected to rotate with the other of said elements, a second planet carrier, helical planet gears on both said carriers meshed respectively with said helical sun gearing, an intermediate member comprising a helical annulus gear meshing with the planet gears of said first named planet carrier and attached to said second planet carrier, a second intermediate member comprising a helical annulus gear meshing with the planet gears of said second planet carrier, a fixed abutment member, thrust bearings between said elements, a thrust bearing between said first named carrier and an extension of said second intermediate member, said thrust bearings being arranged to counterbalance axial movement of the elements of said gearing, and means whereby additional, incremental thrusts originating in said gearing are absorbed by said fixed abutment member.

19. In power driving and driven devices, in combination, an input power element, an output power element, interconnected gearing effective to transmit power therebetween at different speed ratios, said gearing having intermeshed helical teeth, a rotatable carrier for certain members of said gearing, a fixed thrust absorption means associated with said output power element, thrust absorption means intermediate said carrier and one element of said gearing, means to transmit thrust from said latter named means to said fixed thrust absorption means, and a rotatable thrust absorption means effective to absorb compression thrusts originating between said first named elements.

20. In positive reaction variable speed gearing, in combination, an input shaft, an output shaft, two pinions rotating with the first of said shafts, a carrier member rotatable with the other of said shafts and supporting planets meshing with one of said pinions, a second carrier member supporting planets meshing with the other of said pinions, an annulus gear meshing with the first named planets and rotatable with said second carrier, a second annulus gear meshing with said second named planets, a drum integral with said second annulus gear and carrying a clutch element adapted to sustain a compounded couple through the planets carried on both said members, a mating clutch element carried by one of said shafts, braking means for said drum, and control means operable to alternate the actuation of said clutch and said brake means in such a manner as to sustain continuous torque drive during the ratio shift interval thus established.

21. In a device of the character described, a driving shaft, a driven shaft, a clutch for directly coupling said shafts, a fluid device for engaging said clutch, speed responsive mechanism operative upon said device for controlling the clutch, alternate means for connecting the shafts through alternately driving gearing and manual means interacting with said mechanism effective to compel change of drive from said clutch to said alternate connecting gearing means under all conditions of operation.

22. In variable speed transmission construction, in combination, a casing, a power shaft, a load shaft, intermediate shafting, gearing elements effective to transmit torque between said shafts and shafting, a fixed bearing supporting said power shaft in said casing, a fixed bearing supporting said load shaft in said casing, thrust bearings between said power shaft and said intermediate shafting, thust bearings between said load shaft and said intermediate shafting, means operative to redistribute thrusts between the rotatable shafts and gearing elements through said thrust bearings, and means effective to transmit residual thrusts not redistributed by said first named means to said fixed bearings.

23. In automatic transmission controls, in combination, a driving element, a driven element, a concentric intermediate element, variable speed gearing connecting said elements embodying fluid pressure sustained clutches, fluid actuated means for operating said transmission to vary the speed ratio between said first two named elements by actuation and release of said clutches, a pressure source for supplying fluid under pressure to said means, and for sustaining said clutches in engagement, control means responsive to the speed of one of said elements for automatically controlling the application of said fluid pressure to said means in establishing changes of driving ratio, a movable member connected to coact with said control means, and means actuated by said member for varying the control action of said control means whereby the speed at which the control action thereof occurs, is varied.

24. In automatic controls for power transmissions, in combination, a driving shaft, a driven shaft, an intermediate shaft, planetating gearing connecting said shafts embodying fluid pressure sustained clutches, fluid pressure actuated devices for operating said transmission, a fluid pressure source for supplying fluid to said devices, means responsive to the speed of one of said members for automatically controlling said fluid pressure, a jointly acting movable control element actuated by said means for controlling the pressure of said fluid, and means actuated by said speed responsive means for superseding the action of said element at a predetermined speed.

25. In controls for power devices, in combination, a driving shaft, a driven shaft, a planetary change speed transmission embodying pressure-sustained clutches for connecting said shafts; fluid pressure actuated means for operating said transmission, a fluid pressure supply source connected to said means, a directing member for said fluid pressure, a control device for said means comprising manually operable elements connected to said member and speed responsive elements connected to said member, and auxiliary manual speed ratio selecting means effective to prevent the action of said device upon selection by the operator of at least one forward speed driving position of said means.

26. In power transmission controls, in combination, an engine, an engine throttle movable into advanced or retarded positions, an accelerator pedal for said throttle, a variable speed transmission driven by said engine comprising input, output, and intermediate elements, actuating mechanism therefor embodying a fluid-sustained clutch member, said mechanism including means for applying a braking reaction to one element of said transmission unit, a control device, a differential lever effective to select actuation of said mechanism, means responsive to the speed of one of said members operative upon said device, means conjointly operative upon said device connected to said accelerator pedal and embodying connecting linkage effective upon both advancing and retarding movements of said pedal.

27. In power devices, in combination, input and output shafts, gearing effective to transmit drive between the shafts, servo mechanism operative to vary the drive of said gearing, a lubrication main for said gearing, a fluid servo main connected to said mechanism, a pump driven by one of said shafts connected to the lubrication main and to the servo main and including a pressure space, a valve operative to distribute fluid pressure from said space to said mains, and means effective to regulate the distribution of pressure by said valve through variations of pressure initiated in said pressure space.

28. In automatic pressure regulating devices for servo and lubrication systems, in combination, a fluid pressure lubrication and servo pump embodying a pressure space, multiple fluid pressure delivery mains connected to said space, an automatic valve effective to regulate the delivered pressure from said pump to said mains, and means operative upon excessive pressure operation of said pump to relieve pressure within said space while maintaining the pressure operating characteristics in certain of said mains delivering servo pressures.

29. In power controls, in combination, a driving shaft, a driven shaft, a planetary change speed transmission connecting said shafts, a plurality of fluid actuated devices for operating said transmission, means for supplying fluid to said devices, means responsive to the speed of one of said members for distributing the fluid to said devices in various combinations, manually responsive means coacting with said speed responsive means effective conjointly with said means in the selection of actuation of said devices, and a separate manual control means operative in a predetermined position, to render said coaction between the said manual and speed responsive means ineffective.

30. In controls for compounded change speed drives, in combination, a change speed gearing unit, a second change speed gearing unit, speed change actuating means for said first unit, speed responsive ratio selecting mechanism therefor, manual means operative to select speed ratio in the second of said units, means conjointly operable with said mechanism and movable to influence the selection of said speed responsive mechanism, and a connection between said manual means and said conjointly operable means whereby the latter is urged to maximum influencing position upon predetermined setting of said manual means.

31. In variable speed gearing controls, in combination, a primary variable speed transmission unit, a secondary variable speed transmission unit, speed selection means for said primary unit, speed selection means for said secondary unit, speed responsive mechanism operative upon said second means, and a connection between said first and said second named means whereby operation of said mechanism upon said second means is prevented upon a given setting of said first named means.

32. In interlocking controls for power driven devices, in combination, a prime mover, a power shaft, a load shaft, a fluid pressure pump, pressure devices connected to said pump, mechanism operative to drive said pump by rotation of either of said shafts, drive disconnection means between said shafts, drive disconnection means between said power shaft and said prime mover, and operator operable controls for both said means only effective to render said pump inoperative to supply pressure to said devices upon given positioning by the operator.

33. In power transmission mechanism, in combination, a motor having a power shaft, a motor housing, a compartmented gear case adjacent said motor housing, a sealing member for the gear case containing lubricating oil, a lubricating pump mounted in said case driven by the power shaft, a gearing assembly mounted in said case, fluid servo actuating mechanism for said assembly mounted on said case, connecting fluid means between said pump and said mechanism, means to lubricate said gearing from said pump, and an automatic valve operative to control the distribution of oil to both said means.

34. In controls for power gearing, in combination, a driving and a driven shaft, a drum concentric therewith, variable speed gearing mounted in the drum connected to transmit drive between said shafts, control mechanism for said gearing, lubricant supply means connected to the interior of said drum, a pump connected to said means, means normally operative to trap fluid within said drum, and control means for said trapped fluid coincidentally operative with said mechanism whereby trapping of the fluid cushions the change of drive established by said mechanism.

35. In controls for power gearing, in combination, a power shaft having an oil passage therein, pressure means for forcing lubricant through said passage, a drum rotatable with said shaft connected to said passage, and means alternately operable to cause the drum to rotate with the shaft or remain stationary, whereby said first named action is cushioned by the lubricant delivered through said passage.

36. In controls for power devices, in combination, a power shaft, a load carrying element, an intermediate drum acting as a pressure container for fluid pressure, a fluid pressure source connected to said drum, interleaving clutch elements coupling the drum to the shaft, fluid pressure sustaining means for said clutch elements, and means coacting with the pressure provided by said source operative to restrict the application of said means.

37. An engine having a fluid servo pressure space, a driving shaft, a driven shaft, a ratio changing transmission between said shafts, a device responsive to the speed of the driving shaft and operable upon said ratio-changing transmission, connecting mechanism intermediate said device and said space whereby fluid pressure executes selected ratio changes, means responsive to the degree of pressure within said space also operable upon said ratio changing transmission, and adjustable means coacting with said pressure responsive means effective to vary the action upon said ratio changing transmission.

38. In power control devices, an engine, a throttle for the engine, a throttle pedal, a variable speed transmission, speed ratio controlling means for the transmission, a speed responsive governor, an automatic pressure device, differential motion mechanism, means connecting said mechanism with said throttle, said means and said governor operative to coact in selection of speed ratio, and means whereby said device is made operative to supersede the aforesaid action of selection at predetermined pressures.

39. In transmission devices, in combination, a variable speed gearing unit embodying input, output and rotatable intermediate elements, a second variable speed gearing unit embodying input, output and intermediate elements, shafting joining the output element of the first to the input element of the second unit, speed responsive ratio control mechanism for said first unit, speed ratio control mechanism for said second unit, and connecting means operative between said mechanisms to shift speed ratio in both gearing units simultaneously.

40. In power controlling devices, in combination, a power shaft, a variable speed gearing unit receiving drive from said shaft, a second variable speed gearing unit receiving drive from said first unit, a load shaft, fluid pressure actuating devices to change ratio in both said units, control mechanism for said devices, a manually operative change speed control means, and means connecting said control means and said mechanism operative to establish a simultaneous shift in speed ratio in both units.

41. Power control systems embodying, a variable speed gearing unit including input, output and reaction elements, speed ratio control means for said unit, actuating mechanism connected to said means operative to establish changes of speed ratio in said unit, biasing means normally active to influence said mechanism to lock the reaction element against rotation, controlled means operative to render said biasing means ineffective, a selection device for said controlled means, and means operated by said device when in a given position to reinforce the action of said biasing means.

42. In power control systems, in combination, a power shaft, a load shaft, a variable speed gearing, a second variable speed gearing, biasing mechanism normally effective to determine reduction drive in said first named gearing, biasing mechanism normally effective to determine reduction drive in said second named gearing, a selection control means connected to establish speed ratio changes in both said gearings, and reinforcing means controlled by said control means operative to strengthen both biasing mechanisms at given settings.

43. A variable speed transmission unit, a fluid pressure device for said unit including a ratio actuation cylinder, a shift reinforcing means, and a second shift reinforcing means, a control valve for said device movable sequentially to one position in which said fluid pressure is delivered to said ratio actuation cylinder, a second position in which fluid pressure is delivered to said first named reinforcing means, a third position in which fluid pressure is delivered to both said reinforcing means, and operative to drain said cylinder or said reinforcing means in order, simultaneously with said positionings, whereby a smooth transition in speed ratio in said unit is obtained.

44. In fluid pressure controls for variable speed transmissions, in combination, a variable speed gear, a second variable speed gear, an intermediate shaft between said gearing delivering torque from one to the other, fluid actuated speed control devices for each gear, a collar surrounding said shaft, fluid passages in said collar, connecting fluid passages in said shaft, connecting passages operative to deliver fluid pressure from said devices, a fluid pressure source, fluid passages leading to said collar passages from said source, and positionable control valving operative to deliver fluid pressure to or relieve it from either or both devices at predetermined positions.

45. In heat control devices for power transmissions, in combination, variable speed gearing, speed ratio control mechanism for said gearing, a servo fluid pump operative to actuate said mechanism, friction means subject to said mechanism effective to transmit torque or sustain torque reaction in said gearing, passages to deliver fluid to said friction surfaces connected to said pump, a receiver connected to said pump, a heat exchanger connected to said pump containing a coolant, and means whereby heat developed in said friction means is circulated to said heat exchanger.

46. In controls for power gearing, in combination, a variable speed transmission unit, fluid pressure actuating means therefor connected to a source of fluid pressure, porting in said connections, a toggle actuated valve controlling said porting having selective operating positions, a rod connected to said toggle, control means for said rod embodying speed responsive and manually responsive elements, and a biasing means constantly operative to urge said valve to one of said operating positions.

47. In gearshift mechanism in combination, a transmission unit including a gear drive having a plurality of meshing gear elements one of which elements is arranged to move from a direct driving position to a geared drive meshing position, shifter mechanism for said unit, and means embodied in said mechanism operative to move two elements of said gear drive simultaneously into mesh and sequentially mesh one of said two elements with a third element.

48. In controls for power gearing, in combination, a power shaft, a control pedal, a variable speed transmission unit driven by the shaft embodying gearing arranged to provide step ratios, actuator means for said unit operative to establish drive in direct or through said gearing, auxiliary power means connected to said actuator means, a speed responsive means, a differential lever, means connecting said pedal with said lever effective to urge the latter to move with force varying with different pedal positions, an element moving with said speed responsive means connected to said differential lever, and speed ratio control device operative upon said power means to shift said actuator means and connected to said lever, and means to adjust the relative length of said element whereby the relative positions at which said device becomes operative are predeterminable.

49. In controls for power gearing, in combination, a variable speed transmission unit, automatic selection means therefor, including a speed responsive device movable over a scale of speed ranges, an enforcing speed ratio control operative to set aside the automatic selection by said means when placed in a given speed ratio position, and means linked with said enforcing control effective in one speed range of said device to establish a shift to higher speed ratios, said last-named means being likewise effective in another speed ratio to restore the ratio setting established by said first enforcing control in the said position.

50. In transmission and gearing support construction, in combination, a fixed support, a shaft, a bearing between the shaft and the support, a carrier rotatable with said shaft supporting axial thrust generating planet gears, a concentric reaction sustaining element rotatable with said shaft, thrust transmitting means between said carrier and said element, and thrust transmitting means between said element and said shaft effective to transmit thrusts delivered through said element to said shaft whereby partial cancellation of said axial thrusts is obtained.

51. In automatic auxiliary gearing for motor driven vehicles, in combination, a throttle controlled prime mover, a variable speed gearing unit including input, output and reaction elements, gearing associated with said elements effective to transmit drive through combined rotational and orbital motion of planet gears, clutching means operative to establish a direct driving couple between said input and output elements, reaction sustaining means operative to establish drive through said gearing, controls for both said means, a selection device for said controls, and a mechanism operative upon said device embodying relatively movable members coacting to establish actuation of one of said means, one of which members responds to variations in speed, the other of which is moved according to the throttle control motion of said prime mover.

52. A variable speed gearing unit comprising, in combination, an engine, an engine speed throttle pedal, an input annulus gear, an output carrier, planet pinions mounted to rotate in and with said carrier, an intermediate reaction sun gear, a drum rotating integrally with said sun gear, a clutch member rotating with said drum, a mating clutch member rotating with said carrier, a control element for said clutch members, a reaction supporting element associated with said drum, mechanism operative to alternate actuation of said clutch or said element in a predetermined sequence, and a connection embodying sequentially yielding and positively acting members between said pedal and said mechanism whereby movement of the pedal is effective to influence the action of said mechanism according to the position of the pedal for both increasing and decreasing ratio shifts.

53. In auxiliary transmissions, in combination, an engine, a speed control pedal for the engine, a variable speed transmission, a speed ratio control for said transmission, a governor, linkage between said governor and said speed ratio control, mechanism connecting said pedal with said control providing a range of pedal movement wherein engine speed alone is influenced, and a second range of pedal movement wherein influence upon said control is permitted, and means to vary the pedal position at which the second range of action occurs for both increasing and decreasing ratio shifts.

54. A power transmission control comprising, in combination, a throttle pedal, a speed ratio influencing mechanism embodying a governor and connected to said pedal, means to vary the relative point in pedal travel at which said pedal connection becomes effective to influence change of speed ratio, and additional means to vary the governor effect alone upon said mechanism.

55. In power transmission control devices, in combination, a control pedal, a speed ratio control member, a governor, means connecting said governor and said member, a coacting resilient connection between said pedal and said member embodying lost motion mechanism, and means to vary the relative effect of the governor alone upon said member for predetermined positions of said pedal.

56. In a device for coupling a driving shaft to a driven shaft, a clutch to connect the shafts directly, a friction element to establish drive between the shafts indirectly, biasing means operative to load said element for application, control mechanism to engage and disengage the clutch and to apply or release said element against the action of said means, and additional loading means effective to reinforce the action of the biasing means.

57. A power element, a load element, an intermediate element, gearing connecting said elements for transmitting drive between input and output elements, reaction means effective to establish drive through said gearing, a releasable clutch operative to establish a couple between said shafts, means biasing said clutch for disengagement, pressure applying means effective to overcome said biasing means and engage the clutch, biasing means normally active to load said reaction means, pressure applying means effective to overcome said second named biasing means, and control mechanism whereby both said pressure applying means are made operative together.

58. In transmission construction, a transmission casing, output and input shafting supported therein on bearings, multiple web compartments formed in said casing, each housing transmission gearing units arranged to transmit torque between said output and input shafting, a fluid pressure system comprising fluid pressure pump means mounted on a web of one of said compartments, lubricant channels in said web connecting said gearing and said bearings to said means, fluid pressure actuation devices likewise connected to said means, and a reservoir common to said compartments connected to said pump for supplying fluid to said system.

59. In transmission construction, a transmission casing, output and input shafting supported therein on bearings, multiple web compartments formed in said casing, each housing transmission gearing units arranged to transmit torque between said output and input shafting, a fluid pressure system comprising fluid pressure pump means mounted on a web of one of said compartments, lubricant channels in said web connecting said gearing and said bearings to said means, fluid pressure actuation devices likewise connected to said means, a reservoir common to said compartments connected to said pump for supplying fluid to said system, and a heat exchanger mounted adjacent said pump means adapted to receive fluid from said reservoir and deliver fluid to said pump means.

E. A. THOMPSON.